(12) United States Patent
Pinnavaia et al.

(10) Patent No.: US 7,534,415 B2
(45) Date of Patent: May 19, 2009

(54) MESOSTRUCTURED TRANSITION ALUMINAS

(75) Inventors: Thomas J. Pinnavaia, East Lansing, MI (US); Zhaorong Zhang, East Lansing, MI (US); Randall Hicks, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 220 days.

(21) Appl. No.: 11/320,025

(22) Filed: Dec. 28, 2005

(65) Prior Publication Data

US 2006/0120952 A1 Jun. 8, 2006

Related U.S. Application Data

(62) Division of application No. 09/917,147, filed on Jul. 27, 2001, now Pat. No. 7,090,824.

(51) Int. Cl.
*C01F 7/02* (2006.01)
(52) U.S. Cl. .................................................. 423/625
(58) Field of Classification Search ................ 423/600, 423/625, 626, 629
See application file for complete search history.

(56) References Cited

U.S. PATENT DOCUMENTS 6,027,706 A 2/2000 Pinnavaia et al.

OTHER PUBLICATIONS

Wefers, K. et al, Oxides and Hydroxides of Aluminum, Alcoa Technical Paper No. 19, Revised, Alcoa Labs, 1987.
www.reheis.com; Gupta, R.K. Advanced Drug Delivery Reviews, 32 155-172 (1998).
Bagshaw, S.A., et al, Chem. Intern. Ed. Engl. 1996; 35, 1102-1105.
Davis et al, Chem. Mater. 1996, 8, 1451.
Gabelica et al, Microporous Mesoporous Mater. 2000, 35-36, 597.
Cabrera et al, Adv. Mater. 1999, 11, 379.
Rowsell, J. et al, J. Am. Chem. Soc., 2000 (122) 3777.
Allouche, L. et al, Chem. Int. Ed. 2000, 39 (3) 511.
Gonzalez-Pena, V., et al., Microporous and Mesoporous Materials 44-45 203-210 (2001).
Gonzalez-Penz, V., et al., Stud. Surf. Sci. Catal. 135, 204 (2001).

*Primary Examiner*—Timothy Vanoy
*Assistant Examiner*—James Fiorito
(74) *Attorney, Agent, or Firm*—Ian C. McLeod

(57) ABSTRACT

Mesoporous crystalline alumina compositions and process for the preparation thereof are described. The compositions are useful as catalysts and absorbents.

10 Claims, 14 Drawing Sheets

MESOSTRUCTURED TRANSITION ALUMINAS

CROSS-REFERENCE TO RELATED APPLICATIONS

This application is a divisional of application Ser. No. 09/917,147 filed on Jul. 27, 2001 now U.S. Pat. No. 7,090,824.

STATEMENT REGARDING FEDERALLY SPONSORED RESEARCH DEVELOPMENT

This invention was funded by NSF CHE-9903706. The U.S. Government has certain rights in this invention.

BACKGROUND OF THE INVENTION

Field of the Invention

The class of aluminum oxide reagents known as "transition aluminas" play commercially important roles as catalysts or catalyst supports in many chemical processes, including the cracking, hydrocracking and hydrodesulfurization of petroleum, the steam reforming of hydrocarbon feed stocks ranging from natural gas to heavy naphthas to produce hydrogen, the synthesis of ammonia, and the control automobile exhaust emissions, to name a few. Transition aluminas also are used extensively as absorbents.

The usefulness of transition aluminas in catalysis and adsorption processes can be traced to a combination of favorable textural properties (i.e., relatively high surface areas and porosity) and surface chemical properties that can be either acidic or basic depending in part on the transition alumina structure and on the degree of hydration and hydroxylation of the surface. Structurally, all transition aluminas are disordered crystalline phases. Although the oxygen atoms are arranged in regularly ordered close packed arrays, the aluminum atoms adopt different ways of occupying the tetrahedral and octahedral interstacies within the oxygen lattice. Variations in the relative placement of aluminum ions in the tetrahedral and octahedral positions leads to different phases that can be distinguished by NMR techniques and by x-ray diffraction and other scattering methods. At least seven different transition alumina phases have been described, namely, chi, kappa, rho, eta, gamma, delta, and theta (Wefers, K. and Misra, C., Oxides and Hydroxides of Aluminum, Alcoa Technical Paper No. 19, Revised, Alcoa Laboratories, 1987).

Transition aluminas are formed through the thermal dehydration and dehydroxylation of aluminum trihydroxides (e.g., gibbsite or bayerite) or aluminum oxyhydroxides (e.g., boehmite, diaspore). Collectively, the hydroxides and oxyhydroxides of aluminum are called aluminum hydrates or hydrated aluminas, although they have very different formulas corresponding to $Al(OH)_3$ and $AlO(OH)$, respectively. The thermal dehydration of gibbsite can lead to the formation of chi, kappa, rho, eta or theta transition aluminas, depending on the heating rate, the dwell temperature and the atmosphere in contact with the solid phase. The thermal dehydration of boehmite can afford gamma, eta, delta, or theta phases, depending on the conditions of dehydration and the particle size and degree of crystallinity of the starting boehmite (Wefers, K. and Misra, C., Oxides and Hydroxides of Aluminum, Alcoa Technical Paper No. 19, Revised, Alcoa Laboratories, 1987. Pseudoboehmite, a poorly ordered form of boehmite with a small primary particle size, is often a preferred precursor to transition aluminas, because it typically affords derivatives with relatively high surface areas and pore volumes. Boehmite and pseudoboehmite are useful aluminas in their own right, particularly when they are in high surface area form. For instance, Rehyrazal™ is a high surface area boehmite that is used extensively as a vaccine adjuvant (www.reheis.com; Gupta, R. K., Advanced Drug Delivery Reviews, 32 155-172 (1998)).

All transition aluminas will form the structurally stable and comparatively inert aluminum oxide known as alpha alumina when heated to a temperature above about 1000° C. Because transition aluminas are formed through thermal dehydration processes, they are sometimes called "activated aluminas". However, the term "transition aluminas" is more appropriate, because these phases are encountered as intermediates along the thermal pathways that transform hydrated aluminas to alpha alumina.

Among the transition aluminas mentioned above, those derived from the thermal dehydration of boehmite and pseudoboehmite, particularly gamma and eta, are often preferred for catalytic and adsorption applications. Gamma alumina is formed from well ordered boehmite at a temperature above about 400 to 450° C. depending on the particle size. Pseudoboehmite, a disordered form of boehmite containing an amorphous alumina fraction, can be transformed to eta alumina upon dehydration. Gamma alumina formed from course grained boehmite may be transformed to delta alumina at about 800° C. Both eta and delta aluminas transform to theta alumina at temperatures above about 800-900° C. depending on particle size. Finally, theta alumina transforms to alpha alumina above about 1000° C.

Recently reported studies indicate that these transition alumina phases can be mixtures of transition phases with one transition alumina phase being dominant. But the purity of the transition alumina phase is not the limiting factor in determining the performance properties in catalysis and adsorption. Normally, it is the textural properties (i.e., the pore size, pore volume, and surface area), along with the surface chemical properties, that determine the performance properties of a transition alumina in catalysis and adsorption. As noted earlier, the phase and hydration state of the surface determines the surface properties. However, the textural properties are determined by the fundamental (primary) particle size of the alumina, as well as the aggregated particle size. By optimizing the textural properties, one may expect to greatly improve the performance properties of a transition alumina derived from boehmite. The surface areas of most commercially available gamma aluminas, for example, typically have a BET surface area<250 $m^2/g$ and a pore volume<0.50 cc/g. Thus, there is a need to develop transition alumina phases with substantially improved textural properties in order to achieve improved performance in catalysis and adsorption.

It has been recognized recently that the surface area and porosity of an alumina can be substantially increased by forming a mesostructure through supramolecular assembly pathways (Bagshaw, S. A.; Pinnavaia, T. J., Angew. Chem. Intern. Ed. Engl. 1996, 35, 1102-1105; Pinnavaia, T. J.; Bagshaw, S. A., U.S. Pat. No. 6,027,706). In this approach a surfactant is used to direct the formation of a mesostructure with walls comprised of the alumina. Removing the surfactant by solvent extraction or by calcination generated a mesostructured alumina. The formation of a mesostructure was indicated by the presence of at least one low angle refection in the x-ray diffraction patterns of the as made alumina-surfactant composition and the final surfactant-free alumina. The low angle diffraction peak corresponded to a pore to pore correlation distance of at least 2.0 nm. Several examples of similar mesostructured aluminas have been reported more recently (Davis et al., Chem. Mater. 1996, 8, 1451; Gabelica et al., Microporous Mesoporous Mater. 2000, 35-36, 597; Cabrera et al. Adv. Mater. 1999, 11, 379). For all of these previously reported mesostructured aluminas, however, the walls of the mesostructure were amorphous. That is, neither the oxygen atoms nor the aluminum atoms were arranged on lattice points, as indicated by the absence of Bragg reflections in the wide angle region of the diffraction patterns. Consequently, these reported mesostructured aluminas can be described as being mesostructured alumina gels. They have limited stability under hydrothermal conditions. Also, these mesostructured aluminas with atomically amorphous framework walls lacked the desired surface acidity and basicity characteristic of an atomically ordered transition alumina, thus limiting their usefulness in chemical catalysis and adsorption. Thus, there is a need to form mesostructured forms of transition aluminas with atomically ordered pore walls, as well as mesostructured forms of hydrated aluminas which serve as precursors to transitions aluminas.

OBJECTS OF THE INVENTION

It is therefore an object of the present invention to provide transition aluminas and precursor hydrated aluminas which are mesoporous. It is further an object of the present invention to provide a process for producing such aluminas which is economical and relatively easy to perform. These and other objects will become increasingly apparent by reference to the following description and the drawings.

SUMMARY OF THE INVENTION

The present invention relates to a mesostructured crystalline hydrated alumina composition exhibiting at least one low angle x-ray diffraction line corresponding to a lattice spacing of at least 2.0 nm and multiple wide angle x-ray diffraction lines with CuK$\alpha$ radiation wherein $\lambda$ is 0.1541 nm corresponding to an ordered lattice comprised of oxygen atoms and hydroxide groups with aluminum in interstitial positions within the lattice, wherein the surface area is at least 200 $m^2/g$; and wherein the pore volume is at least 0.40 $cm^3/g$.

The present further relates to a mesostructured crystalline hydrated alumina and organic modifier composite composition wherein the composition exhibits at least one low angle x-ray diffraction line corresponding to a lattice spacing of at least 2.0 nm and multiple wide angle x-ray diffraction lines corresponding to an ordered lattice comprised of oxygen atoms and hydroxide groups with aluminum in interstitial positions within the lattice.

Further, the present invention relates to a mesostructured crystalline transition alumina composition:

wherein the composition exhibits at least one low angle x-ray diffraction line corresponding to a lattice spacing of at least 2.0 nm and multiple wide angle x-ray diffraction lines with CuK$\alpha$ radiation where $\lambda$ is 0.1541 nm corresponding to an ordered oxygen atom lattice with aluminum in interstitial positions within the lattice, wherein the surface area is at least 200 $m^2/g$; and wherein the pore volume is at least 0.40 $cm^3/g$.

The present invention also relates to a process for the preparation of a mesostructured hydrated alumina-organic modifier composite composition which comprises:

(a) reacting an alumina precursor selected from the group consisting of aluminum salts, oligomeric oxyhydroxyaluminum cations, non-ionic aluminum molecules and mixtures thereof in solution with hydroxide ions in the presence of an organic modifier at a temperature between 0° and 200° C. for a period of time sufficient to cause crystallization; and (b) filtering, washing and drying the product.

The present invention also relates to a process for the preparation of a mesostructured hydrated alumina composition which comprises:

(a) adding a stoichiometric quantity of water to an aluminum alkoxide, optionally in alcohol solution, at a temperature between 0° and about 100° C. for a period of time sufficient to cause hydrolysis of the aluminum alkoxide and crystallization of the mesostructured hydrated alumina phase; and (b) filtering, washing and drying the product in air.

The present invention also relates to a process for the preparation of the mesostructured hydrated alumina composition exhibiting at least one low angle x-ray diffraction line corresponding to a lattice spacing of at least 2.0 nm and multiple wide angle x-ray diffraction lines with CuK$\alpha$ radiation wherein $\lambda$ is 0.1541 nm corresponding to an ordered lattice comprised of oxygen atoms and hydroxide groups with aluminum in interstitial positions within the lattice, wherein the surface area is at least 200 $m^2/g$; and wherein the pore volume is at least 0.40 $cm^3/g$; which comprises treating a mesostructured crystalline hydrated alumina and organic modifier composite composition, wherein the composition exhibits at least one narrow angle x-ray diffraction line corresponding to a lattice spacing of at least 2.0 nm and multiple wide angle x-ray diffraction lines corresponding to an ordered lattice comprised of oxygen atoms and hydroxide groups with aluminum in interstitial positions within the lattice, so that the organic modifier is removed by solvent extraction, thermal treatment, or a combination of solvent extraction and thermal treatment.

The present invention also relates to a process for the preparation of a mesostructured transition alumina composition which exhibits at least one low angle x-ray diffraction line corresponding to a lattice spacing of at least 2.0 nm and multiple wide angle x-ray diffraction lines with CuK$\alpha$ radiation where $\lambda$ is 0.1541 nm corresponding to an ordered oxygen atom lattice with aluminum in interstitial positions within the lattice; wherein the surface area is at least 200 $m^2/g$; wherein the pore volume is at least 0.40 $cm^3/g$;

which comprises heating a mesostructured crystalline hydrated alumina composition exhibiting at least one low angle x-ray diffraction line corresponding to a lattice spacing of at least 2.0 nm and multiple wide angle x-ray diffraction lines with CuK$\alpha$ radiation wherein $\lambda$ is 0.1541 nm, corresponding to an ordered lattice comprised of oxygen atoms and hydroxide groups with aluminum in interstitial positions within the lattice to a temperature in the range 400 to about 900° C. for a period of time to cause dehydration of the hydrated alumina and the formation of the mesostructured form of the transition alumina.

The present invention also relates to a process for the formation of a mesostructured transition alumina composition:

wherein the composition exhibits at least one low angle x-ray diffraction line corresponding to a lattice spacing of at least 2.0 nm and multiple wide angle x-ray diffraction lines with CuK$\alpha$ radiation where $\lambda$ is 0.1541 nm corresponding to an ordered oxygen atom lattice with aluminum in interstitial positions within the lattice;

wherein the surface area is at least 200 $m^2/g$; and wherein the pore volume is at least 0.40 $cm^3/g$ which comprises treating a mesostructured crystalline hydrated alumina and organic modifier composite composition, wherein the composition exhibits at least one low angle x-ray diffraction line corresponding to a lattice spacing of at least 2.0 nm and multiple wide angle x-ray diffraction lines corresponding to an ordered lattice comprised of oxygen atoms and hydroxide groups with aluminum in interstitial positions within the lattice; a to a temperature in the range 400 to about 900° C. for a period of time to cause removal of the organic modifier component, dehydration of the hydrated alumina component, and the formation of the mesostructured form of the transition alumina.

The present invention relates to a process for converting a first liquid or gas stream to a second liquid or gas stream using a catalyst, the improvement in which comprises:

using as the catalyst or catalyst component an alumina composition selected from the group consisting of (a) a mesostructured crystalline hydrated alumina composition exhibiting at least one low angle x-ray diffraction line corresponding to a lattice spacing of at least 2.0 nm and multiple wide angle x-ray diffraction lines with CuKα radiation wherein λ is 0.1541 nm corresponding to an ordered lattice comprised of oxygen atoms and hydroxide groups with aluminum in interstitial positions within the lattice, wherein the surface area is at least 200 m²/g; and wherein the pore volume is at least 0.40 cm³/g;

(b) a mesostructured crystalline hydrated alumina and organic modifier composite composition wherein the composition exhibits at least one narrow angle x-ray diffraction line corresponding to a lattice spacing of at least 2.0 nm and multiple wide angle x-ray diffraction lines corresponding to an ordered lattice comprised of oxygen atoms and hydroxide groups with aluminum in interstitial positions within the lattice; and (c) a mesostructured crystalline transition alumina composition: wherein the composition exhibits at least one low angle x-ray diffraction line corresponding to a lattice spacing of at least 2.0 nm and multiple wide angle x-ray diffraction lines with CuKα radiation where λ is 0.1541 nm corresponding to an ordered oxygen atom lattice with aluminum in interstitial positions within the lattice, wherein the surface area is at least 200 m²/g; and wherein the pore volume is at least 0.40 cm³/g.

Finally, the present invention relates to the process for adsorbing a component from a gas or liquid stream, the improvement which comprises using as an adsorbent or adsorbent component an alumina composition selected from the group consisting of (a) a mesostructured crystalline hydrated alumina composition exhibiting at least one low angle x-ray diffraction line corresponding to a lattice spacing of at least 2.0 nm and multiple wide angle x-ray diffraction lines with CuKα radiation wherein λ is 0.1541 nm corresponding to an ordered lattice comprised of oxygen atoms and hydroxide groups with aluminum in interstitial positions within the lattice, wherein the surface area is at least 200 m²/g; and wherein the pore volume is at least 0.40 cm³/g;

(b) a mesostructured crystalline hydrated alumina and organic modifier composite composition wherein the composition exhibits at least one narrow angle x-ray diffraction line corresponding to a lattice spacing of at least 2.0 nm and multiple wide angle x-ray diffraction lines corresponding to an ordered lattice comprised of oxygen atoms and hydroxide groups with aluminum in interstitial positions within the lattice; and (c) a mesostructured crystalline transition alumina composition: wherein the composition exhibits at least one low angle x-ray diffraction line corresponding to a lattice spacing of at least 2.0 nm and multiple wide angle x-ray diffraction lines with CuKα radiation where λ is 0.1541 nm corresponding to an ordered oxygen atom lattice with aluminum in interstitial positions within the lattice, wherein the surface area is at least 200 m²/g; and wherein the pore volume is at least 0.40 cm³/g.

DESCRIPTION OF PREFERRED EMBODIMENTS

Figure 1:
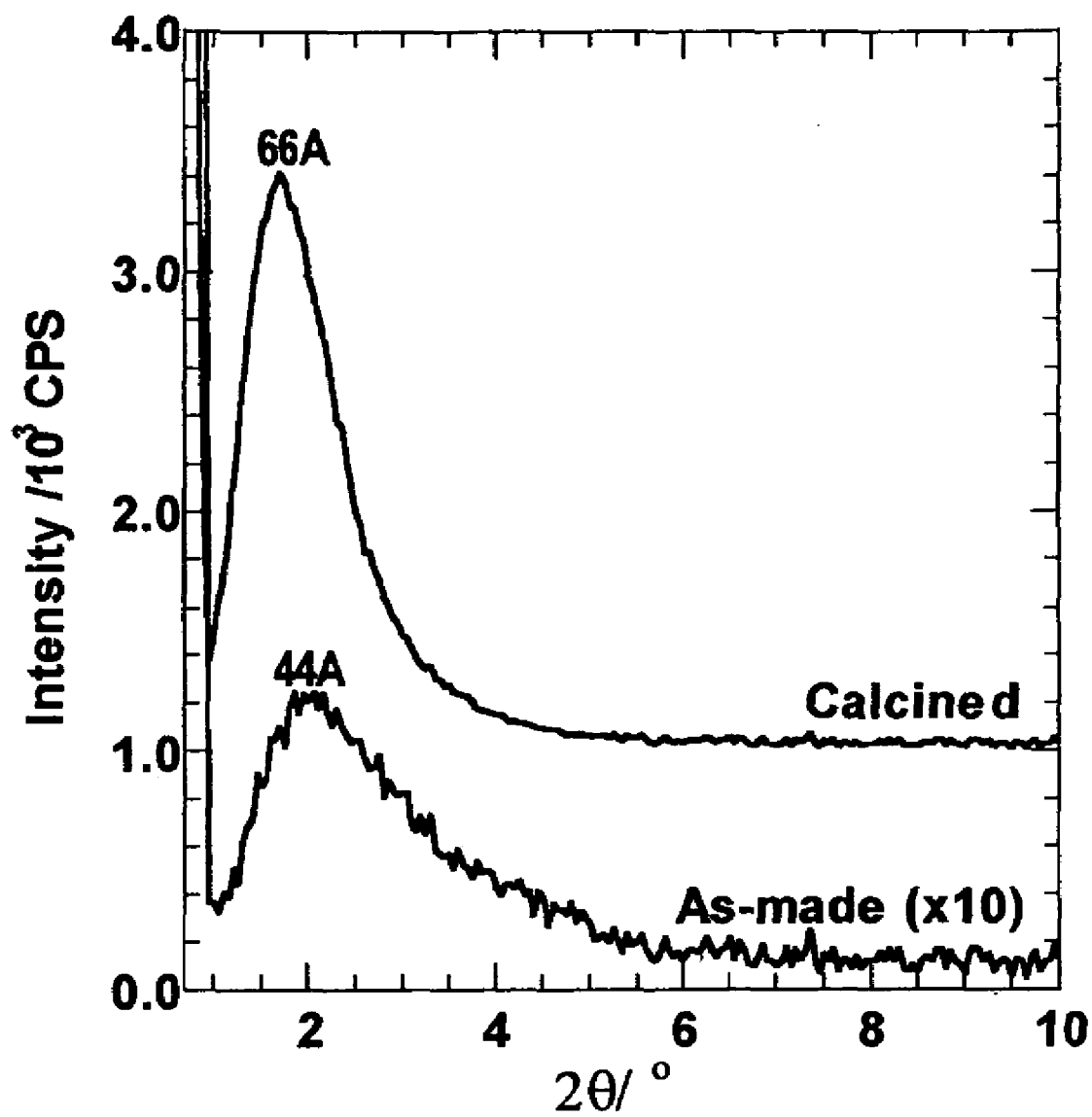
FIG. 1 shows small angle XRD patterns of MSU-S/B and MSU-γ mesostructures assembled from Al$_{13}$ oligocations and nonionic Pluronic P84 surfactant according to Example 3.

The present invention describes compositions of matter that comprise mesostructured forms of transition aluminas. This invention also discloses mesostructured forms of hydrated aluminas, particularly mesostructured boehmite, which is a valuable precursor to several mesostructured transition aluminas. The textural properties of these compositions are generally superior and more useful in catalytic and adsorption applications in comparison to bulk transition aluminas or bulk hydrated aluminas that lack a mesostructured framework. The mesostructured forms of transition aluminas are derived in part from the thermal treatment of mesostructured hydrated alumina-organic modifier composite compositions. Depending on the thermal processing conditions used for the removal of the organic modifier and the dehydration of the hydrated alumina phase, mesostructured forms of hydrated aluminas and transition aluminas are formed that are free of the organic modifier and suitable for improved use in adsorption and catalytic applications.

DESCRIPTION OF THE INVENTION

The first embodiment of this invention is directed toward the preparation of a mesostructured hydrated alumina phase. In particular, we disclose the preparation of mesostructured forms of boehmite, which are denoted as MSU-S/B aluminas. Evidence for a mesostructured boehmite phase is provided by the presence of at least one x-ray diffraction line in the low angle region corresponding to a lattice spacing of at least 2.0 nm. In addition, the diffraction patterns of the said mesostructured boehmites exhibit wide angle reflections characteristic of a bulk, atomically ordered boehmite phase. This combination of low angle and wide angle x-ray reflections is unique among boehmite phases. The low angle reflection is indicative of a network that is ordered on a mesoscopic length scale (i.e., 2.0-50 nm), whereas the wide angle reflections show that the particles comprising the mesoscopic network contain an atomically ordered boehmite phase.

The ordered mesoscopic network of an MSU-B boehmite contains pores, the size of which is correlated with the lattice spacing for the low angle diffraction peak. However, the mesostructured pores are not the only pores present in these mesostructured boehmite compositions. In addition to the mesostructured pores, there are textural pores. Textural pores are defined here as intra- and interparticle pores that are not sufficiently ordered to give rise to a x-ray diffraction peak. The textural pores have a relatively broad distribution that typically overlaps the pore distribution associated with the mesostructured network. Thus, the actual pore size distribution, as determined from the adsorption or desorption branches of the nitrogen adsorption-desorption isotherms, typically exceeds the lattice spacing of the mesostructured boehmite network. Nevertheless, the pores associated with the mesostructured network are very desirable in practical applications involving adsorption and reactivity, because they contribute to the overall surface area and pore volume of the boehmite. For instance, a mesostructured boehmite is expected to be a much more potent vaccine adjunct than a conventional boehmite due to its higher surface area and pore volume.

In general, as the length scale of a mesostructured MSU-B boehmite network increases, the average size of the overall pore distribution also increases. It is not possible, however, to quantitatively distinguish between the pores originating from the ordered mesoscopic network indicated by the low angle x-ray reflection and those originating from a particle texture that does not have an x-ray diffraction signature. In general, mesostructured boehmite compositions with the largest network length scale are preferred, because the overall surface area and pore volume typically as measured by nitrogen adsorption increases with increasing network pore-pore correlation distance as measured by low angle x-ray diffraction.

The mesostructured boehmite compositions of this invention are prepared by one of two general methods. The first method utilizes the hydrolysis of an aluminum alkoxide as a means of controlling the growth of primary boehmite particles that intergrow to form a mesostructured network of particles and pores that give rise to a low angle x-ray diffraction line. Although the hydrolysis of aluminum alkoxides has been used extensively to form boehmite and pseudoboehmite compositions previously (Industrial Alumina Chemicals, C. Misra, ACS Monograph 184 ACS, Washington, D.C. p. 48 (1986)), the possibility of forming mesostructured boehmites through this pathway has gone unrecognized. However, the alkoxide hydrolysis pathway is sensitive to the sequence of addition of the reagents, as well as to the reaction stoichiometry. For this reason, the pathway is generally difficult to implement reproducibly and is less preferred.

The more preferred method of preparation of a mesostructured MSU-B boehmite is through the condensation polymerization reaction of an alumina precursor in the presence of a non-ionic amine or non-ionic polyethylene oxide modifier. The presence of the modifier controls the growth of primary boehmite particles and regulates the intergrowth and aggregation of the particle. Therefore, the size of the mesostructured network pores and textural pores are regulated by the amine and PEO modifier. Amine and PEO modifiers with surfactant properties are preferred modifiers, in part, because they not only regulate the growth of the primary particles and texture of the intergrown and aggregated particles, but they also occupy space and enlarge the size of the mesostructured pores and textural pores present in the boehmite. Also, the use of a non-ionic modifier allows a variety of precursors to be used as an alumina source, many of which are less costly than aluminum alkoxides. Thus, the organic modifier route to the mesostructured boehmite compositions of this invention are preferred.

The organic amine and PEO modifiers are removed from the mesostructured boehmite composition by thermal evaporation or thermal decomposition at a temperature below the transition temperature of the boehmite (typically less than about 400° C.). Alternatively, the modifier can be removed by solvent extraction or by a combination of solvent extraction and thermal evaporation/decomposition. The open pore structure made available through the removal of the organic modifier can then be used to accommodate other guest molecules for applications in adsorption and chemical conversions.

The second principal embodiment of this invention is directed at mesostructured forms of transition aluminas. The structural properties of these compositions parallel those described above for mesostructured boehmite, except that the aluminum oxide comprising the mesostructured network is an atomically ordered transition alumina. Thus, the mesostructured transition aluminas of this invention exhibit a low angle x-ray diffraction peak corresponding to a lattice spacing of at least 2.0 nm and wide angle diffraction peaks characteristic of an atomically ordered transition alumina. These mesostructured transition aluminas have surface areas and pore volumes that are substantially larger than conventional transition aluminas. For example, commercial grades of transition aluminas have only textural porosity and lack the ordered mesoscopic network structure of the present convention. Typical surface areas and pore volumes for these commercial grades of transition aluminas, including the most commonly used gamma-alumina, are in the range 200-250 m$^2$/g and 0.35-0.50 cm$^3$/g. In contrast, the mesostructured transition aluminas of this invention, which we denote as MSU-γ, typically have surface areas beyond the 200-250 cm$^3$/g range and pore sizes well beyond 0.50 cm$^3$/g. These large surface areas and pore volumes make the mesostructured MSU-γ alumina and other transition aluminas of this invention particularly attractive as catalysts and catalyst support. Gamma-alumina, for instance, is widely used as a catalyst component in petroleum refining. This oxide, in combination with clay, metakaolin, zeolites, and other oxides, comprises an important active ingredient in commercial petroleum cracking catalysts. The mesostructured gamma-alumina of this invention is expected to be an even better petroleum refining catalyst component, owing primarily to the higher available surface areas and pore volumes. In addition to being an improved ingredient for the fluidized catalytic cracking and hydrocracking of petroleum, the mesostructured transition aluminas of this invention also should be useful catalyst components for many other chemical conversions, including the hydrodesulfurization of petroleum, the steam reforming of hydrocarbons, ammonia synthesis, and many other heterogeneous catalytic processes.

The mesostructured transition aluminas of this invention are formed from the thermal dehydration of hydrated aluminas that have been prepared in the presence of non-ionic organic modifiers. In one of the preferred forms of the invention, the hydrated alumina is a boehmite that has been crystallized in the presence of a non-ionic amine, alcohol, or polyethylene oxide (PEO) modifier. The resulting boehmite-organic modifier composite composition, which we denote in general as a MSU-S/B alumina, is then heated to a temperature above about 400° C. to remove the organic modifier and to transform the hydrated alumina component to a mesostructured gamma-alumina, which we denote here as MSU-γ-alumina. It is further preferred that the amine and PEO modifier is a surfactant, which helps to improve the pore volume of the final mesostructured transition alumina. It is yet further preferred that the initial hydrated alumina-organic modifier composition is mesostructured, though this is not essential. Even MSU-S/B boehmite-modifier composite compositions that are not mesostructured (as evidenced by the lack of a low angle XRD peak) can be transformed into a mesostructured transition alumina. We presume that although the initial hydrated alumina-organic modifier composition is not mesostructured, such compositions apparently can become mesostructured during the thermal treatment process leading to the formation of the mesostructured transition alumina. Nevertheless, having the initial hydrated alumina-modifier composite in mesostructured form is highly preferred.

This disclosed approach to mesostructured transition aluminas is not restricted to the use of boehmite as the hydrated alumina component in the initial hydrated alumina-organic modifier composition. Those skilled in the art of alumina chemistry will know that other forms of hydrated aluminas can be thermally dehydrated to transition aluminas. Thus, possible alternatives to boehmite in the initial hydrated alumina-organic modifier precursor include diaspore, gibbsite, and bayerite. Also, it is known that one transition alumina phase can be transformed into another transition alumina under suitable processing conditions. Thus, the teaching of this invention should apply as well to the preparation of other mesostructured transition alumina phases, including delta, theta, chi, rho, eta, kappa, as well as gamma.

The mesostructured alumina compositions of this invention can be formed from a variety of precursors. Suitable precursors include the following general groups of aluminum compounds:

ionic aluminum salts containing hydrated aluminum cations, such as aluminum trichloride hexahydrate, aluminum trinitrate nonahydrate, and the hydrolyzed aluminum cations of these salts when they are dissolved in aqueous solution (for example, hydrated Al(OH) $(H_2O)_5^{2+}$ and $Al_2(OH)_2(H_2O)_8^{4+}$ cations)

non-ionic aluminum-containing molecular composition, such as an aluminum alkoxides, anhydrous aluminum halides, aluminum beta-diketonates and the like.

Oligomeric aluminum cations, such as the cation comprising aluminum chlorhydrate, $Al_{13}O_4(OH)_{24}(H_2O)_{12}^{7+}$, the related $Al_{30}$ cationic oligomer, and like ions of higher aluminum nuclearity (J. Rowsell, and L. F. Nazar, *J. Am. Chem. Soc.*, 2000 (122) 3777. L. Allouche, G. Gerardin, T. Loiseau, G. Ferey, and F. Taulelle, Angew. *Chem. Int. Ed.* 2000, 39 (3) 511).

Oligomeric oxyhydroxycations of aluminum formed by reaction of mixtures of aluminum cations in solution and finely divided aluminum metal.

The preferred organic modifiers used in forming the mesostructured alumina compositions of this invention are non-ionic surfactants selected from the groups comprising non-ionic surfactants wherein the hydrophilic segment of the surfactant is a polyethylene oxide block and non-ionic alkylene amine, alkylene polyamine, and polypropylene oxide amine surfactants. Also, preferred are non-ionic amine modifiers, especially alkylene amines; an alkylene polyamines, an polypropylene oxide amine, and polypropylene oxide polyamines, particularly those that exhibit surfactant properties.

EXAMPLES

In the Examples provided below, the synthesis and properties of the mesostructured boehmite and gamma-alumina phases of this invention is demonstrated. The as-synthesized MSU-B and MSU-S/B and calcined MSU-γ-compositions were characterized by X-ray diffraction (XRD) using a Rigaku Rotaflex equipped with Cu-Kα radiation; λ=0.1541 nm). The presence of a low angle diffraction peaks corresponding to average pore to pore correlation lengths of at least 2.0 nm was indicative of a hierarchical mesostructure. Wide angle XRD reflections were used to indicate the presence of atomically ordered walls of boehmite or a transition alumina.

Nitrogen BET surface areas, pore volumes and framework pore sizes were determined using nitrogen adsorption-desorption methods. The sorptometer used to record the adsorption-desorption isotherms was a Micromeritics ASAP 2010 and Tristar instruments. The samples for adsorption measurement were degassed at 150° C. and <10$^{-5}$ torr for 12 h before measurement. In defining the pore size distribution we applied the BJH model to both the adsorption and desorption isotherms in order to characterized the framework pore structure. Owing to the presence of a hysterisis loop for all samples, the adsorption isotherm always provided a higher value of the average pore size. In characterizing the compositions of the present invention we report both pore sizes.

Particle textures were examined by Transmission Electron Microscopy (TEM) using a JEOL 100 CX2 electron microscope.

Examples 1-3

These Examples illustrate the use of the following non-ionic organic modifiers for the preparation of mesostructured surfactant-boehmite composite compositions (denoted MSU-S/B) using aluminum chlorhydrate, $[Al_{13}O_4(OH)_{24}(H_2O)_{12}]Cl_7$ as the aluminum source Example 1: Pluronic L64 (BASF, $EO_{13}PO_{30}EO_{13}$)
Example 2: Pluronic P65 (BASF, $EO_{19}PO_{30}EO_{19}$),
Example 3: Pluronic P84 (BASF, $EO_{19}PO_{43}EO_{19}$), Each modifier is a polyethylene oxide (PEO)/polypropylene oxide (PPO) tri-block co-polymer surfactant. The aluminum chlorhydrate was supplied by Rehies, Inc. as a 12.4 wt % Al solution. The resulting composite mesostructures were subsequently converted through calcination to surfactant-free mesostructured transition aluminas with gamma alumina framework walls (denoted MSU-γ).

In a typical synthesis 21.78 g of the $Al_{13}$ oligomer solution (0.10 mol Al) was mixed with 4.35 g (1.5 mmol) of L64, or 4.2 g (1.2 mmol) of P65, or 4.2 g (1.0 mmol) of P84 surfactant in a Waring blender for ca. 5 min. The resulting mixtures were aged at 25-45° C. for 24 h till a clear sol was formed. The temperature of the mixtures was then elevated to 70° C. for a period of 6 h. Then 3.02 g (0.05 mol) of concentrated $NH_4OH$ solution (28 wt % $NH_3$) was introduced under gentle agitation to give a final overall $Al/OH^-$ ratio of 1:3. The resulting gels were allowed to age in closed glass reaction vessels at 70° C. for an additional 6 h and then at 100° C. for 24 h. The as-synthesized MSU-S/B composites were air-dried. The XRD powder patterns of each product exhibited low angle diffraction peaks indicative of a wormhole mesostructure with crystalline Boehmite walls and ammonium chloride as a by-product (see below).

Figure 3:
FIG. 3 shows TEM image of mesoporous MSU-γ alumina prepared according to Example 3.

The air-dried MSU-S/B products of Examples 1-3 were calcined in air at 325° C. for 3 h and then at 550° C. for 4 h to completely remove the surfactant and the ammonium chloride by-product and to form a surfactant-free mesostructured MSU-γ-alumina with atomically ordered walls. The ramp rate used to achieve the calcination temperatures was 2° C./min. As illustrated by the diffraction pattern given in FIG. 1, the as-made MSU-S/B composites exhibited a well-defined basal reflection peak in the small angle region 0.5-10 (2θ) degrees, indicating the periodicity of the mesostructured pores. In the wide angle region from 10 to 80 degrees two-theta, the as-made products gave diffraction lines with lattice spacings and relative intensities characteristic of Boehmite (JCPDS Card #21-1307) and α-$NH_4Cl$ (JCPDS Card # 34-0710) as a by-product. The absence of reflections characteristic of the starting reagents indicated that the hydroxylation reaction to form MSU-S/B was completed. Upon calcination of the MSU-S/B products, the mesostructured MSU-γ phases were formed which exhibited wide angle XRD lines consistent with gamma alumina framework walls (JCPDS Card #10-0425). TEM images (FIG. 3) indicated a lamellar framework motif with a slit-like framework pores. The structural properties of these MSU-γ products are summarized in Table 1. It can be seen that the pore size of resulting MSU-γ phase increased with increasing surfactant size.

Examples 4-5

These Examples illustrate the use of non-ionic surfactant Tergitol T15-S-12 with the formula $C_{15}H_{31}(OC_2H_4)_{12}OH$ (Example 4), and Tergitol T15-S-20 with the formula $C_{15}H_{31}(OC_2H_4)_{20}OH$ (Example 5) as structure directors for the assembly of mesostructured MSU-S/B and MSU-γ compositions from aluminum chlorhydrate, $[Al_{13}O_4(OH)_{24}(H_2O)_{12}]Cl_7$, as the aluminum source. The procedure is analogous to that of Examples 1-3, but the surfactant was replaced by the Tergitol surfactants. The molar compositions of the final reaction mixtures were:

21.78 g (100 mmol Al) of $Al_{13}$ solution (Reheis, 12.4 mass % Al)

8.3 g (1.1 mmol) T15-S-12 in Example 4 or T15-S-20 (0.75 mmol) in Example 5

3.02 g (50 mmol) $NH_4OH$ as concentrated solution (28 wt % $NH_3$)

Figure 2:
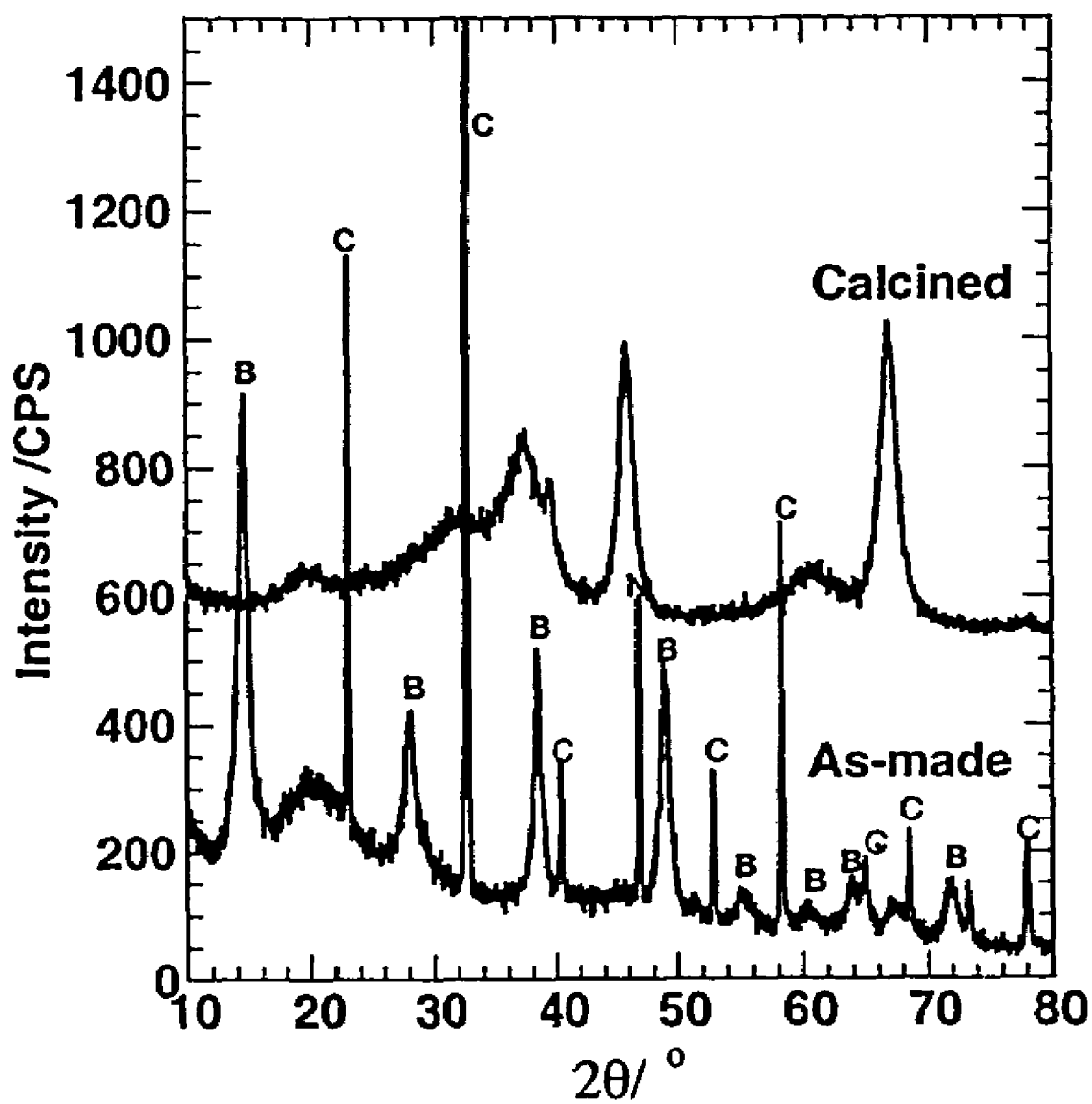
FIG. 2 shows wide angle XRD patterns of MSU-S/B and MSU-γ mesostructures assembled according to Example 3; diffraction lines assigned to boehmite are marked "B" and those assigned to ammonium chloride as a by-product are marked "C".

The XRD patterns of the corresponding as-synthesized MSU-S/B and calcined MSU-γ mesostructures resemble those depicted in FIG. 1 and FIG. 2. The physical properties of the mesostructured products obtained from these two examples are summarized in Table 1.

Example 6

This Example illustrates the synthesis of mesostructured MSU-S/B and MSU-γ compositions alumina from aluminum nitrate as the aluminum source and the non-ionic block co-polymer Pluronic P84 as the structure director. A 37.5 g (0.1 mol) quantity of $Al(NO_3)_3 9H_2O$ was dissolved in 16 g (1 mol) of deionized water then mixed with 6.3 g (1.5 mmol) of Pluronic P84 in a blender for 5 min. The resultant mixture was aged at 35-65° C. for 24 h till a clear sol was formed. The temperature of the sol was elevated to 70° C. for a period of 6 h and then 21.8 g of concentrated $NH_4OH$ solution (0.36 mol $NH_4OH$) was introduced under gentle agitation. The final molar composition of reactants was 1Al:0.02P84:3.6$NH_4OH$. The resulting gel was kept in a closed glass reaction vessel at 70° C. for 6 h, then at 100° C. for 24 h, forming a MSU-S/B mesophase. The XRD pattern indicated the presence of a mesostructure with boehmite walls and the presence of an ammonium nitrate by-product (JCPDS Card #47-0867). The as-synthesized composite was air-dried and calcined in air at 220° C. for 3 h, then at 550° C. for 4 h, using a ramp speed of 2° C./min to reach the indicated dwell temperatures. This heat treatment removed the surfactant and sublimed away the ammonium nitrate by-product, affording a surfactant-free MSU-γ mesostructure. The properties of the relevant mesophases obtained from this example are summarized in Table 1.

Example 7

This example describes the assembly of mesostructured alumina compositions from aluminum chloride as the aluminum source and the non-ionic block co-polymer Pluronic P84 as the structure director. In a typical synthesis 24.1 g (0.1 mol) of $AlCl_3.6H_2O$ was dissolved in 18 g (1 mol) of deionized water and then the solution was mixed with 8.4 g (1.5 mmol) of Pluronic P84 in a blender for 5 min. the mixture was heated at 70° C. and for 6 h and then 21.8 g (0.05 mol $NH_4OH$) of concentrated $NH_4OH$ solution was introduced under gentle agitation. The final composition of reactants was 1Al:0.02P84:3.6$NH_4OH$. The resulting gel was heated an additional at 6 h at 70° C., then at 100° C. for 24 h, to obtain the MSU-S/B surfactant/boehmite mesostructure. The as-synthesized composite was air-dried and converted to mesostructured MSU-γ-alumina by calcination in air at 325° C. for 3 h, then at 550° C. for 4 h using a ramp speed of 2° C./min. A mesostructured MSU-γ-alumina was obtained by the conversion of MSU-B mesophase. The powder XRD patterns of these MSU-S/B and MSU-γ samples were analogous to those depicted in FIG. 1 and FIG. 2. The properties of the mesostructures prepared in this example are summarized in Table 1.

Example 8

This example illustrates the synthesis of mesostructured alumina compositions using as an aluminum source a solution of oligocations formed by the reaction of aluminum chloride and aluminum powder and Pluronic P84 as the structure director. In a typical synthesis 4.1 g of $AlCl_3.6H_2O$ solution (0.017 mol) was dissolved 20 g de-ionized water, and then 2.3 g (0.085 mol) of aluminum powder was suspended in the solution at 80° C. for 8 h. The solid remaining in the suspension (ca. 0.05 g) was filtrated out and the liquid obtained was combined with 4.2 g (1 mmol) of Pluronic P84 in a blender for ca. 5 min, then the resultant mixture was aged at 25-45° C. for 24 h. The temperature of the resultant sol was elevated to 80° C. for 6 h and then 3.02 g of concentrated NH$_4$OH solution (0.05 mol NH$_4$OH) was introduced under gentle agitation. The final composition of reactants was 1Al: 0.01P84:0.5NH$_4$OH. After keeping the resulting gel at 80° C. for 6 h, then at 100° C. for 24 h, we obtained a MSU-S/B surfactant/boehmite mesostructure. After air-drying and calcination of the as-synthesized composite mesostructure in air at 325 for 3 h, then at 550° C. for 4 h, using a ramp speed of 2° C./min, a mesostructured MSU-γ alumina was obtained. Table 1 provides the physical properties of the mesostructured products of this example.

Example 9

Figure 4:
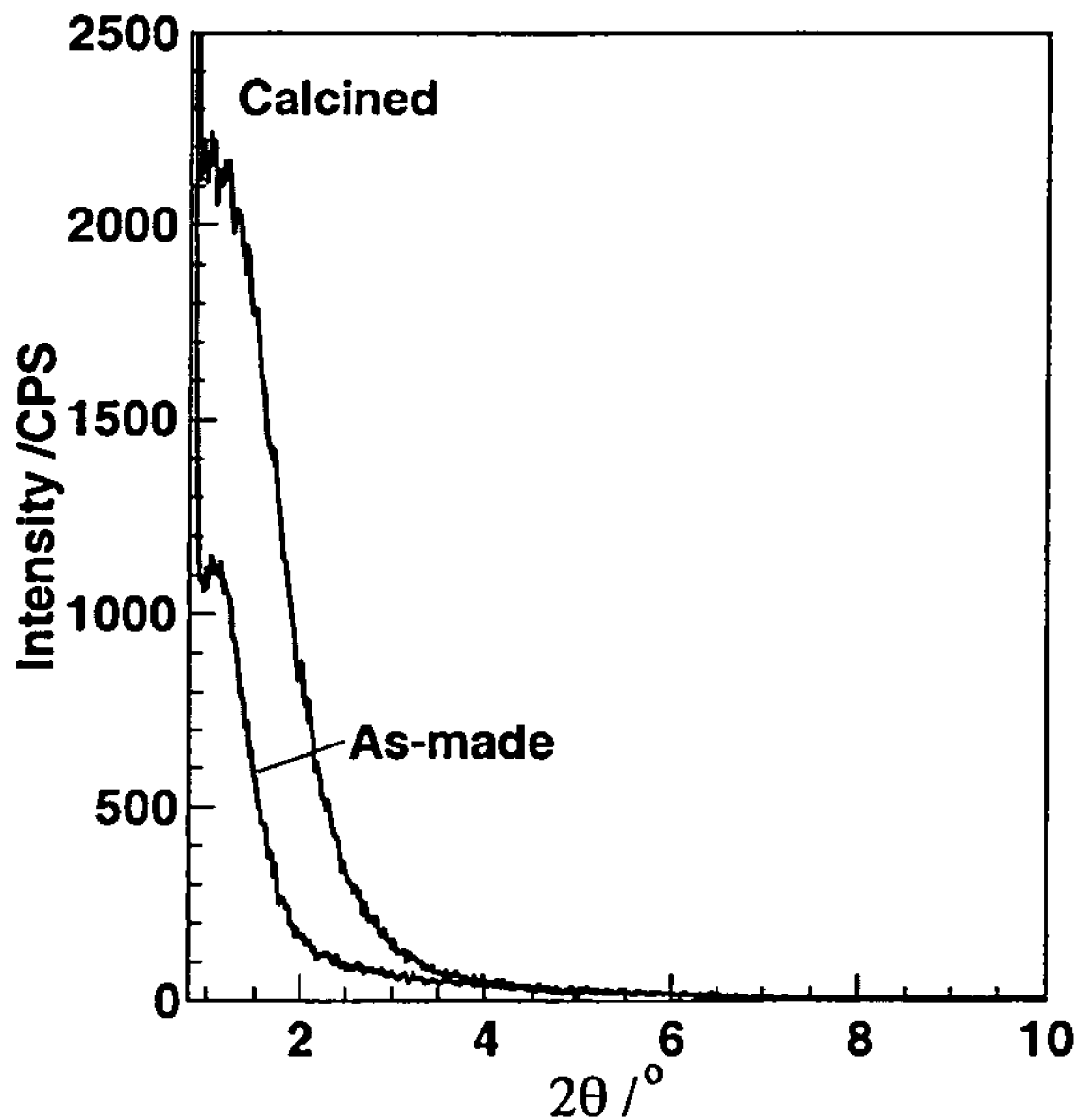
FIG. 4 shows small angle XRD patterns of MSU-S/B and MSU-γ mesostructures assembled from Al$_{13}$ oligocations as the aluminum source and tallow tetra-amine as the structure director as described in Example 9.
Figure 5:
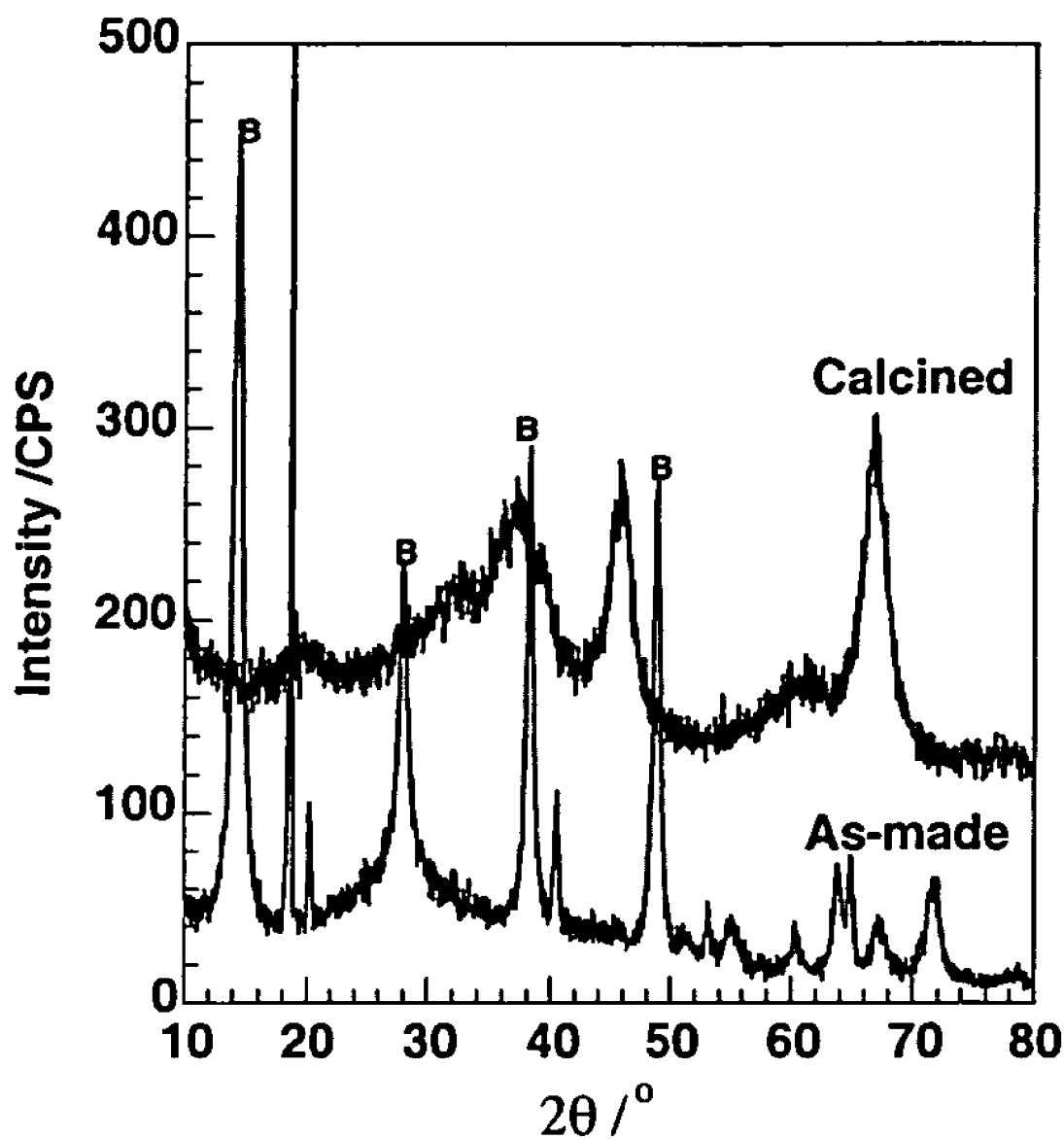
FIG. 5 shows wide-angle XRD patterns of MSU-B (as-made) and MSU-Y (calcined) assembled from Al$_{13}$ with Tallow tetra-amine as described in Example 9. The reflections marked with "B" are attributable to the Boehmite phase comprising the framework walls.
Figure 6A:
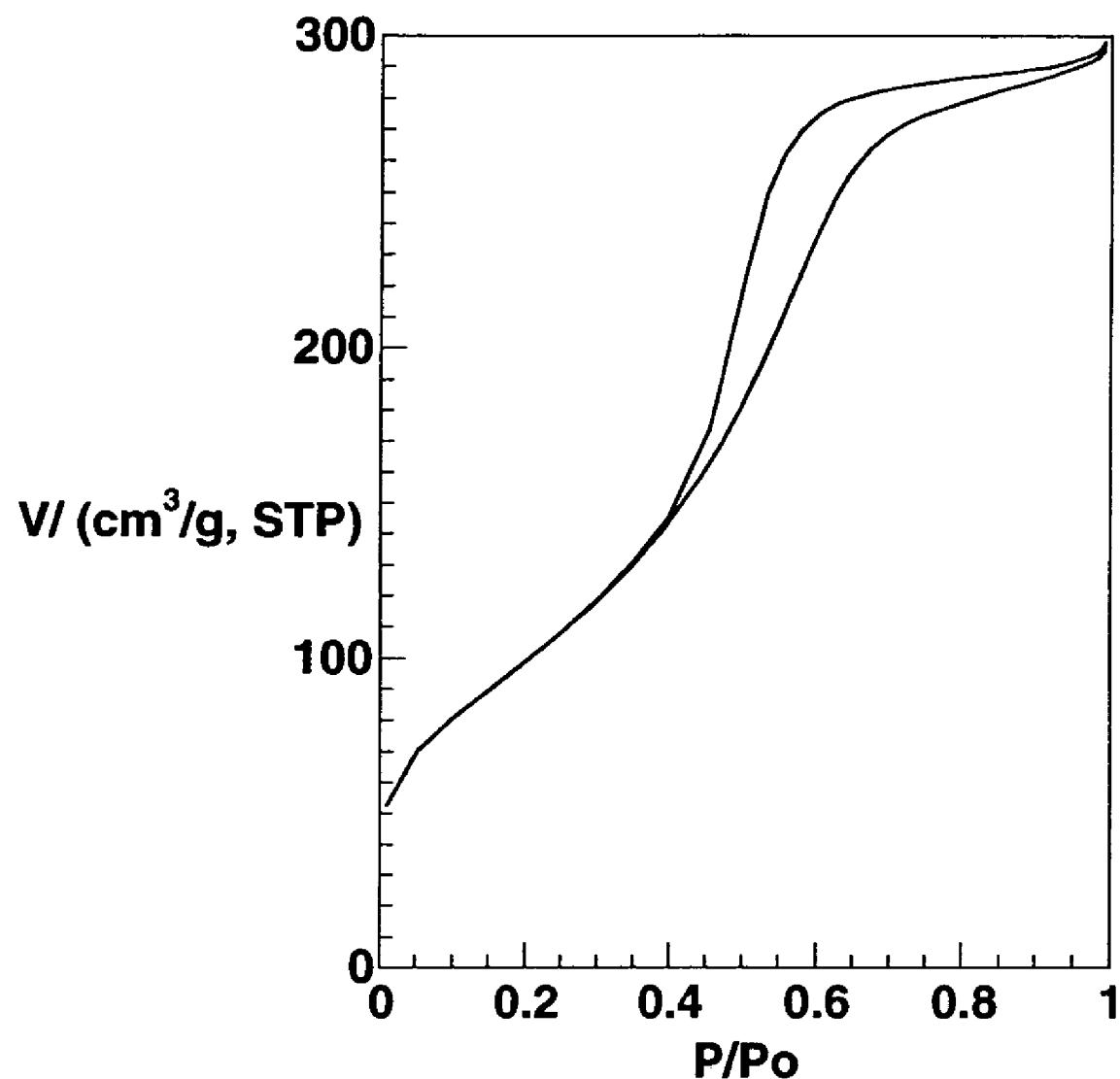
FIG. 6A shows N$_2$ adsorption-desorption isotherms for the MSU-γ alumina prepared according to the method of Example 9.
Figure 6B:
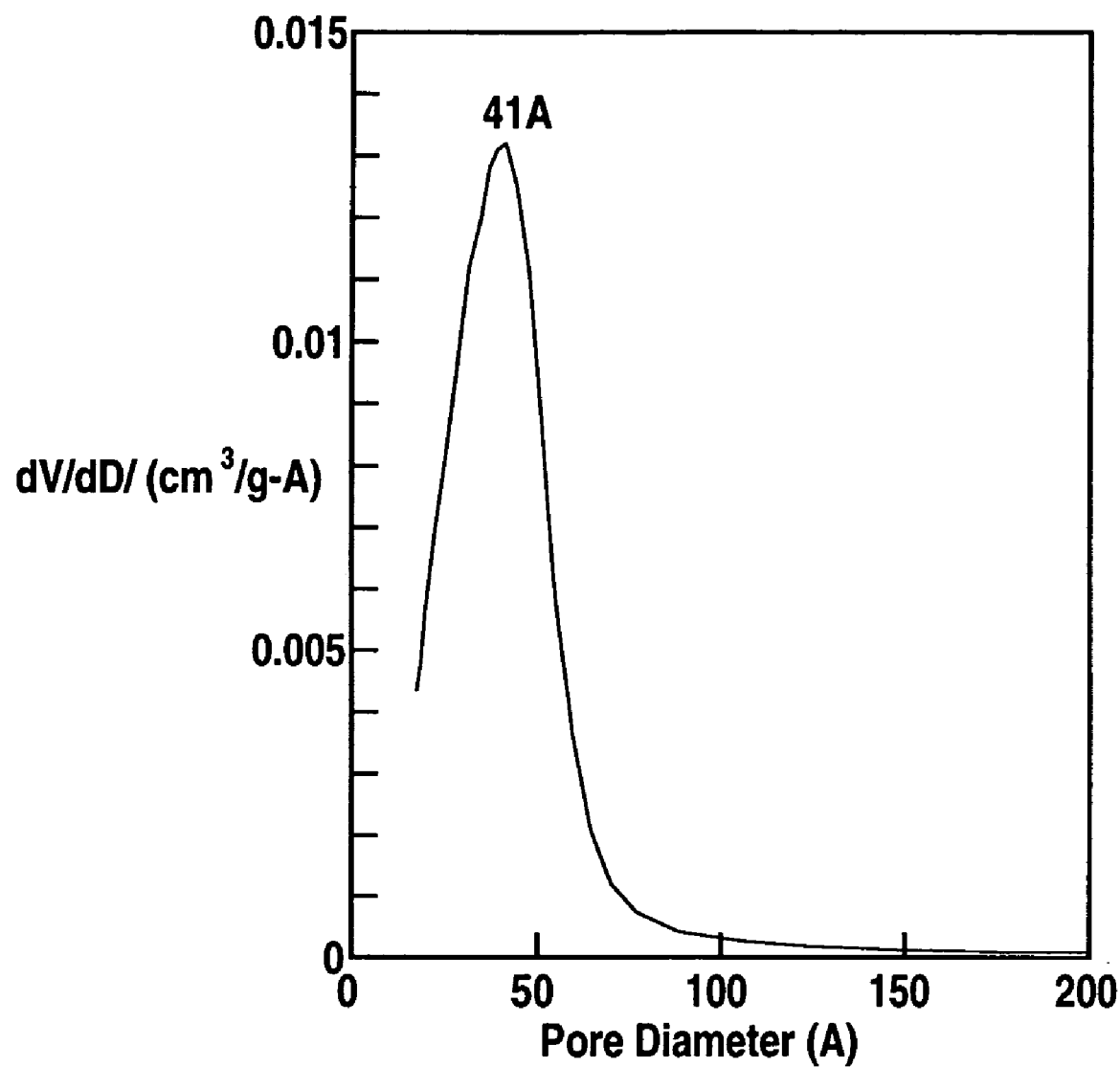
FIG. 6B shows BJH pore size distribution determined from the adsorption for the MSU-γ alumina prepared according to Example 9.

This example illustrates the assembly of mesostructured alumina MSU-S/B and MSU-γ from Al$_{13}$ with tallow tetraamine (TTeA) as the structure-directing agent. A 10.3 g (12.5 mmol) quantity of TTeA was dissolved in 100 ml 70% ethanol solution by volume at 50° C. Then 21.8 g of Al$_{13}$ solution (0.1 mol Al) was introduced. After allowing the resultant gel to age under isothermal conditions for 24 h, then at 100° C. for 24 h, the solids were separated by filtration and air-dried to give a MSU-S/B hybrid mesostructure. The MSU-S/B was calcined at 320° C. for 4 h, then at 550° C. for 4 h, using a ramp speed of 1° C./min to form the pure alumina MSU-γ mesostructure phase. The XRD patterns of the MSU-S/B and MSU-γ mesostructures in the small and wide-angle regions are depicted in FIG. 4 and FIG. 5, respectively. The nitrogen adsorption-desorption isotherms and the BJH pore size distribution curve for the MSU-γ mesostructure are described in FIG. 6A and FIG. 6B.

Example 10

This example illustrates the preparation of mesostructured MSU-S/B and MSU-γ mesostructures from Al$_{13}$ oligocations and dodecylamine (DDA) as the structure director. In a typical synthesis 4.625 g (0.025 mol) of DDA was dissolved in 40 ml of ethanol and 11.89 g (0.05 mol Al) aluminum chlorhydrate solution (Reheis) was diluted with 60 ml de-ionized water. Then the DDA solution was added dropwise into the Al$_{13}$ solution under vigorous stirring. The resultant gel was aged at 35° C. for 24 h, then at 100° C. for 24 h. The solid thus derived was filtered and air-dried to yield a mesostructures MSU-S/B surfactant/boehmite phase. Calcination of the hybrid phase at 550° C. for 4 h gave mesostructured MSU-γ alumina. Physical properties are given in Table 1.

Comparative Examples 11-13

These examples illustrate the syntheses of conventional boehmites and gamma aluminas from Al$_{13}$ oligocations (Example 11), AlCl$_3$ (Example 12), and Al(NO$_3$)$_3$ (Example 13) as aluminum sources, but in the absence of surfactant.

In the synthesis using Al$_{13}$, 21.8 g of aluminum chlorhydrate solution (0.10 mol Al) was directly hydrolyzed with 3.02 g (0.05 mol) NH$_4$OH at 70° C. The resultant solids were treated by following procedure as described in Example 4 to give conventional boehmite and gamma alumina compositions.

The syntheses of condensed boehmite and gamma alumina from Al(NO$_3$)$_3$, and AlCl$_3$ were also conducted by direct hydrolysis of these salts following the procedures described in Example 6 and Example 7, respectively, but leaving out the surfactant.

The XRD patterns of boehmite and gamma-alumina prepared from Al$_{13}$, Al(NO$_3$)$_3$, AlCl$_3$ in the wide-angle region 10-80 (2θ) degrees resembled those for mesostructured alumina prepared in the presence of the surfactant. In contrast, the condensed phases did not exhibit reflections attributable to the presence of mesostructure in the small angle region between 0.5-10 (2θ) degrees.

The textural properties of the condensed gamma alumina phases prepared in the above examples are summarized in Table 1. It is noteworthy that the surface areas and pore volumes of these conventional gamma aluminas are substantially smaller than the mesostructured analogs described in the previous examples.

Comparative Examples 14-15

This comparative example provides the textural properties of conventional gamma aluminas prepared by the thermal dehydration of two commercial forms of boehmite, namely, Dispal 18N4-80 alumina powder (Example 14) and Catapal A alumina (Example 15). Both grades of boehmite were supplied by Vista Chemical Co. of Houston, Tex. The Dispal sample was calcined in air at 325° C. for 3 h and then at 550° C. for 4 h, whereas the Catapal sample was dehydrated at 500° C. for 4 h. Neither mesoporous gamma alumina exhibited a small angle X-ray diffraction peak. This result is consistent with the absence of a mesostructure.

The textural properties of the gamma aluminas derived from the conventional boehmite are given in Table 1 for comparison with the values obtained for the mesostructured transition aluminas embodied in this invention. Note that the surface area and pore volume for the gamma alumina formed from Dispal are substantially smaller than the values obtained for the mesostructured gamma-aluminas of Examples 1-10. The transition alumina formed from Catapal A exhibits a somewhat larger surface area and pore volume, but still generally lower than the values observed for the mesostructured gamma aluminas of this invention.

TABLE 1

Properties of alumina compositions

| | | | | MSU-S/B | MSU-Gamma | | | |
|---|---|---|---|---|---|---|---|---|
| Example | Precursor | Surfactant | Al: Surf: OH Molar ratios | $d_{100}/$ nm | $d_{100}/$ nm | $S_{BET}/$ $m^2g^{-1}$ | Pore Vol./ $cm^3g^{-1}$ | Pore. Size$^a$/ nm |
| 1 | A$_1$ | L64: EO$_{13}$PO$_{30}$EO13 | 1:0.015:0.5 | 3.8 | 5.1 | 307 | 0.53 | 5.8/4.4 |
| 2 | Al$_{13}$ | P65: EO$_{19}$PO$_{30}$EO19 | 1:0.012:0.5 | 3.9 | 5.7 | 266 | 0.59 | 5.9/4.6 |
| 3 | Al$_{13}$ | P84: EO$_{19}$PO$_{43}$EO19 | 1:0.010:0.5 | 4.4 | 6.6 | 299 | 0.73 | 8.0/6.4 |
| 4 | Al$_{13}$ | TS15: | 1:0.11:0.5 | 4.9 | 6.8 | 263 | 0.83 | 9.1/7.2 |

TABLE 1-continued

Properties of alumina compositions

| | | | | MSU-S/B | MSU-Gamma | | | |
|---|---|---|---|---|---|---|---|---|
| Example | Precursor | Surfactant | Al: Surf: OH Molar ratios | $d_{100}$/ nm | $d_{100}$/ nm | $S_{BET}$/ $m^2g^{-1}$ | Pore Vol./ $cm^3g^{-1}$ | Pore. Size[a]/ nm |
| 5 | $Al_{13}$ | $C_{15}H_{31}(OC_2H_4)_{15}OH$ TS20: | 1:0.075:0.5 | 6.3 | 8.0 | 248 | 0.82 | 10.5/8.2 |
| 6 | $Al(NO_3)_3$ | $C_{15}H_{31}(OC_2H_4)_{20}OH$ P84: $EO_{19}PO_{43}EO19$ | 1:0.02:3.6 | 3.3 | 5.3 | 302 | 0.59 | 6.0/5.0 |
| 7 | $AlCl_3$ | P84: $EO_{19}PO_{43}EO19$ | 1:0.02:3.6 | 3.8 | 6.5 | 311 | 0.69 | 8.2/6.3 |
| 8 | $AlCl_3/Al$ | P84: $EO_{19}PO_{43}EO19$ | 1:0.010:0.5 | 4.5 | 9.4 | 298 | 0.78 | 9.6/7.1 |
| 9 | $Al_{13}$ | Tallow tetra-amine: $C_{14-16}NH(C_3H_6NH)_3H$ | 1:0.125:0 | 8.1 | n.d. | 369 | 0.47 | 4.2/4.0 |
| 10 | $Al_{13}$ | DDA: $C_{12}H_{25}NH_2$ | | 5.8 | 5.5 | 231 | 0.36 | 4.0/— |
| 11 | $Al_{13}$ | None | 1:0:0.5 | — | — | 190 | 0.25 | n.d. |
| 12 | $AlCl_3$ | None | 1:0:3.6 | — | — | 222 | 0.25 | n.d. |
| 13 | $Al(NO_3)_3$ | None | 1:0:3.6 | — | — | 55 | 0.13 | n.d. |
| 14 | Dispal | — | — | — | — | 149 | 0.42 | 12.5/7.5 |
| 15 | Catapal A | — | — | — | — | 240 | 0.43 | 7.5/5.8 |

[a]Mean framework pore sizes were calculated from the adsorption/desorption branches of the nitrogen adsorption-desorption isotherms, respectively, by using the BJH model.

Example 16

This example illustrates the formation of an as-made MSU-S/B surfactant/boehmite mesostructure and a mesostructured MSU-γ transition alumina from aluminum sec-butoxide, $Al(OCH(CH_3)CH_2CH_3)_3$, as the aluminum precursor and a non-ionic tri-block copolymer, (BASF Pluronic 84) as the structure director. Pluronic 84, herein denoted P84, has the structure $(EO)_{19}(PO)_{39}(EO)_{19}$, where EO and PO correspond to ethylene oxide and propylene oxide units, respectively.

The reagents used in the synthesis were aluminum sec-butoxide, P84, water, and 2-butanol. They were combined in the following molar ratios:

| | |
|---|---|
| 1.0 | mole $Al(OCH(CH_3)CH_2CH_3)_3$ |
| 0.015 | mole P84 |
| 8.16 | mole water |
| 0.40 | mole 2-butanol |

Figure 7A:
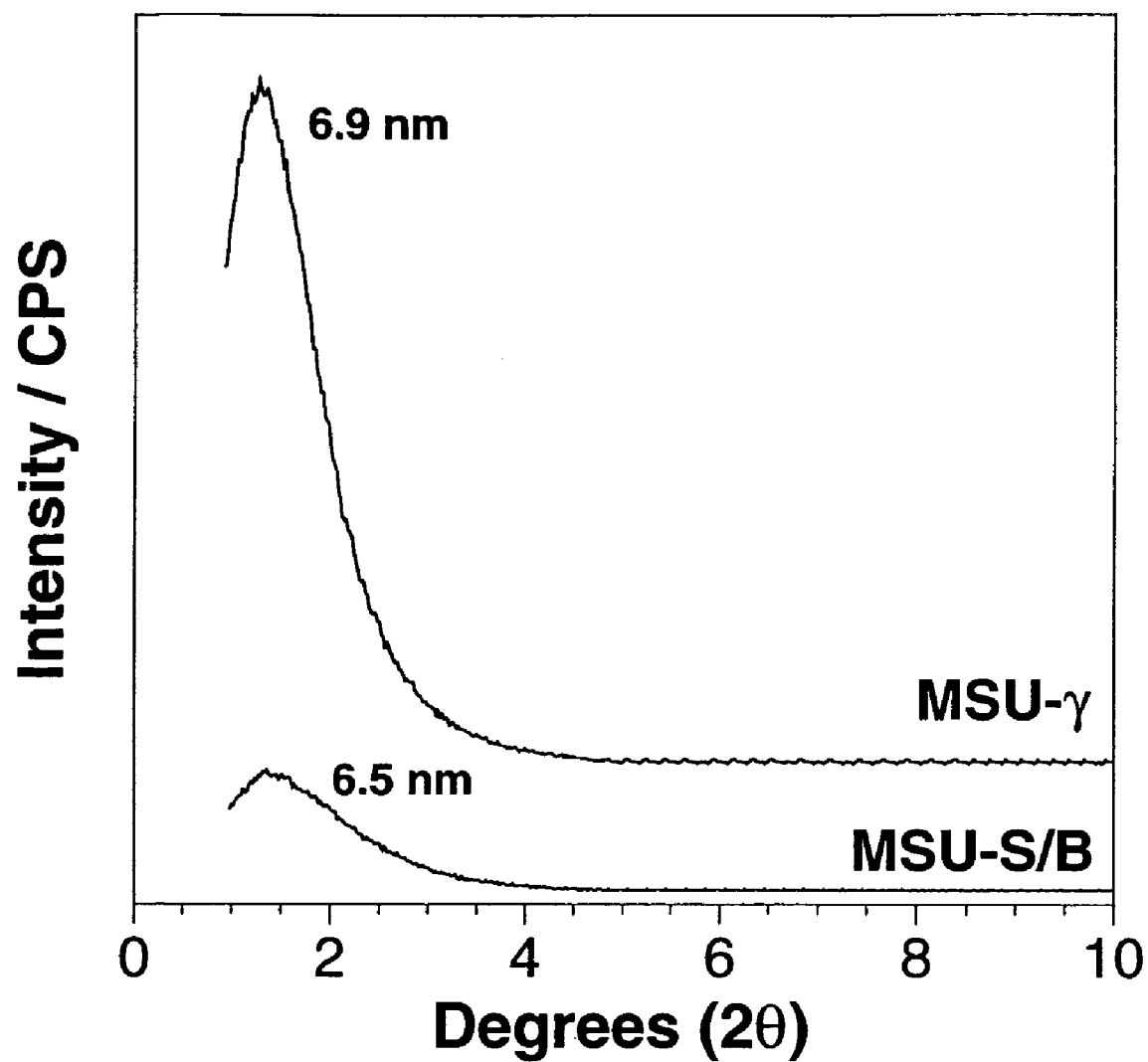
FIG. 7A shows low angle x-ray diffraction patterns of as-made mesostructured MSU-S/B surfactant/boehmite mesostructure prepared from P84 surfactant as the structure director and mesostructured MSU-γ alumina obtained by calcining the as-made MSU-S/B at 500° C. according to Example 16.
Figure 7B:
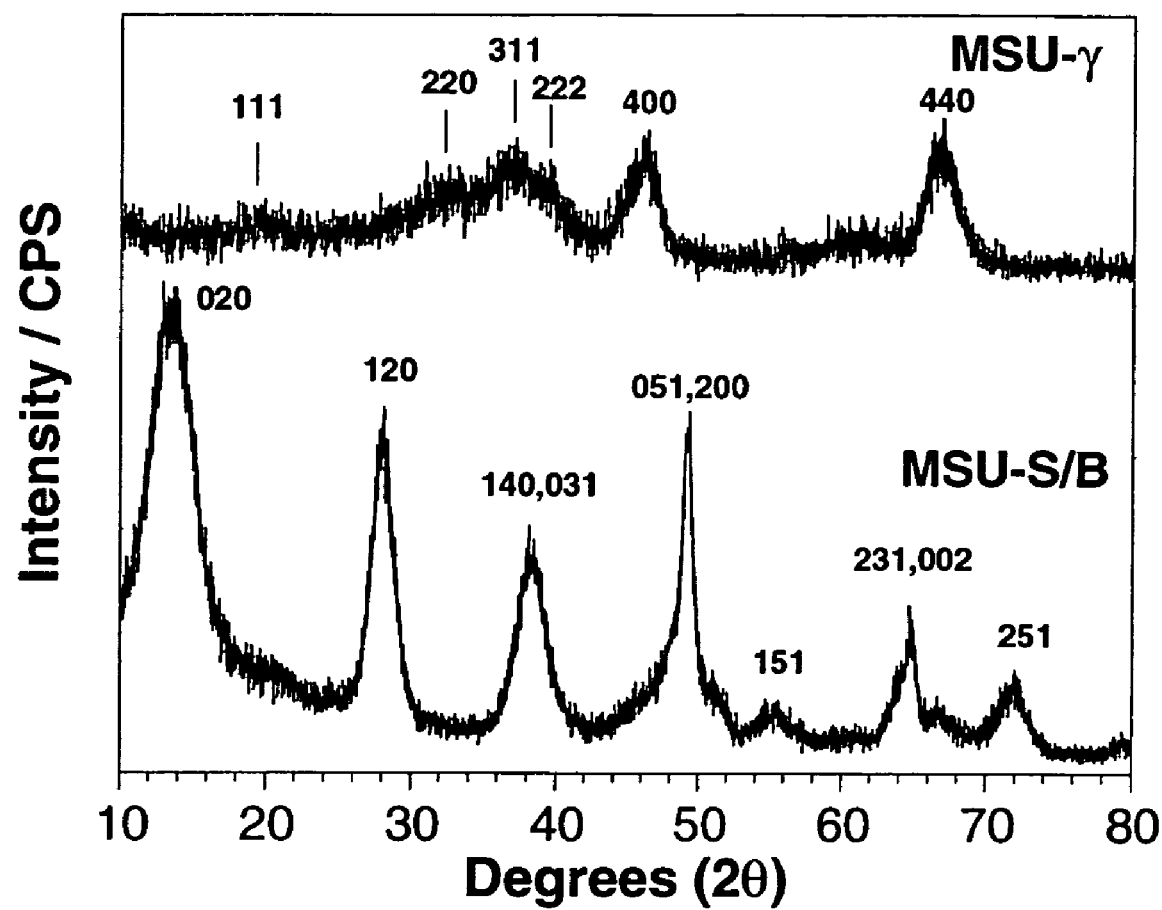
FIG. 7B shows wide angle x-ray diffraction pattern of as-made mesostructured MSU-S/B surfactant/boehmite mesostructure prepared from P84 surfactant as the structure director and mesostructured MSU-γ alumina obtained by calcining the as-made MSU-S/B at 500° C. according to Example 16.

To obtain mesostructured MSU-S/B, the aluminum alkoxide, P84, and 2-butanol were thoroughly mixed in a blender until homogenous. The resulting viscous solution was transferred to a glass jar where the specified amount of water was slowly added with gentle agitation with a spatula in order to achieve thorough mixing and complete hydrolysis of the alkoxide. The jar was sealed with Teflon tape, capped, and placed in an oven at 100° C. for 24 hr. The resulting gel was air-dried. The XRD pattern of the dried MSU-S/B indicated a mesostructured aluminum oxide hydroxide with a mesopore correlation distance of 6.5 nm (FIG. 7A) and multiple wide angle peaks indicative of crystalline boehmite walls (FIG. 7B).

To obtain a mesostructured MSU-γ transition alumina, the MSU-S/B sample was heated was at 2° C./min to 100° C. and held at this temperature for 6 hr. Then the temperature was raised at 2° C./min to 300° C. and held constant for 3 hr. Finally, the temperature was increased at 2° C./min to 500° C. and maintained at this temperature for 2 hr to completely remove the template. The low angle XRD pattern of the calcined product contained a diffraction peak corresponding to a pore to pore correlation distance of 6.9 nm (FIG. 7A).

The low angle patterns verify the presence of a mesostructure for both materials and the wide angle patterns indicate the presence of atomically ordered (crystalline) walls comprised of a transition alumina. The d-spacings that correspond to the peaks in these wide patterns are compared in Table 2 with those provided in the literature for boehmite and gamma alumina.

Figure 8A:
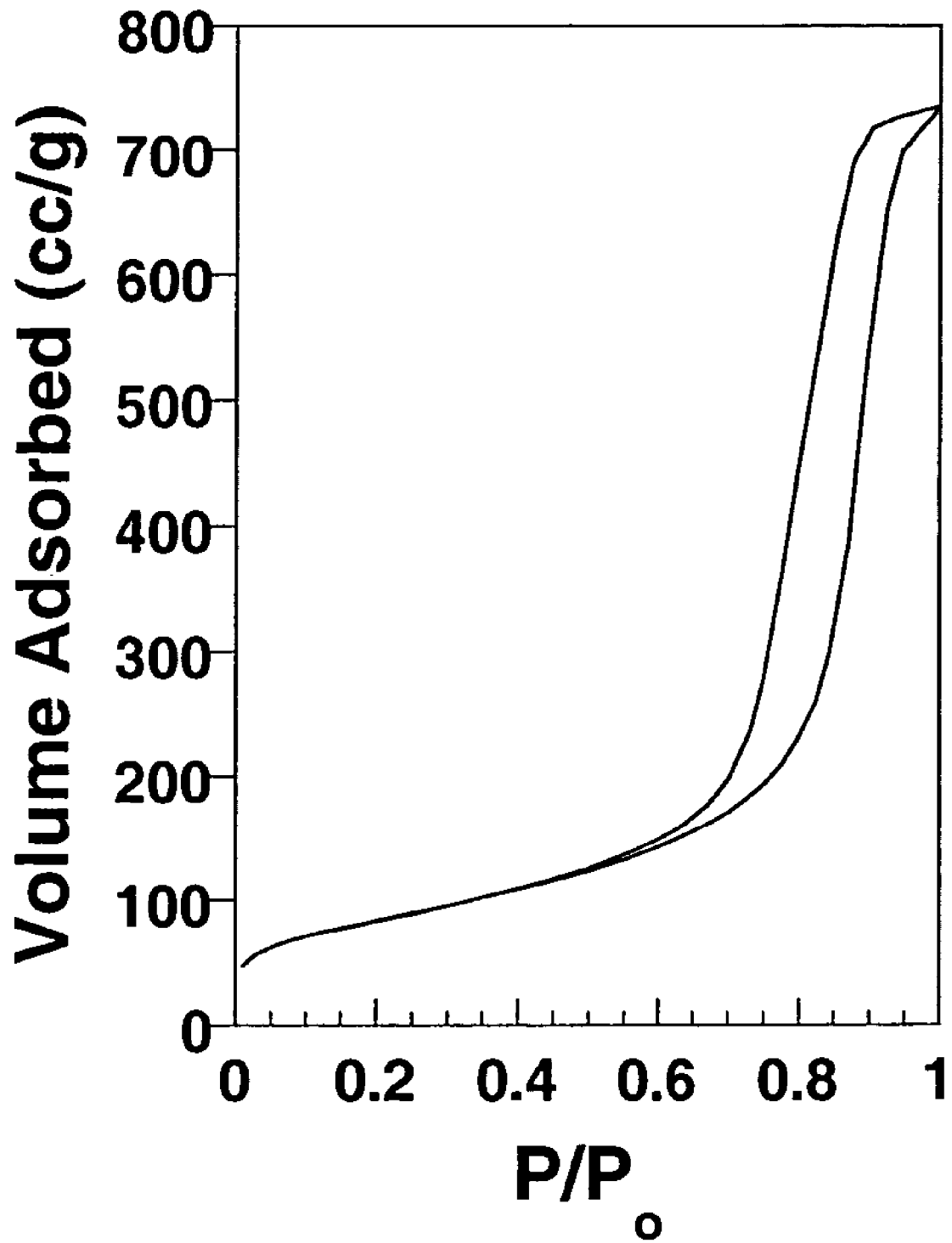
FIG. 8A shows nitrogen adsorption isotherm for MSU-γ alumina obtained according to Example 16.
Figure 8B:
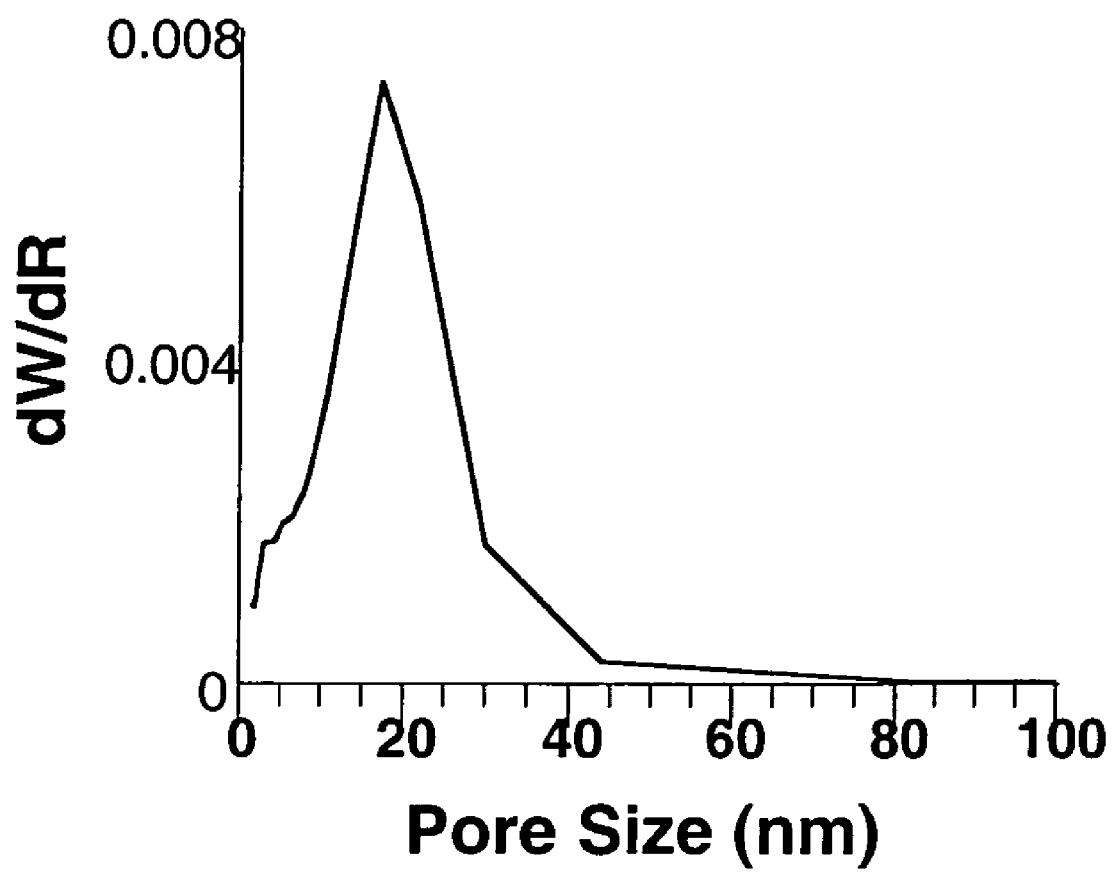
FIG. 8B shows BJH adsorption pore size distribution for MSU-γ alumina obtained according to Example 16.

The nitrogen absorption isotherm for the MSU-γ product obtained in Example 16 is given in FIG. 8A. The filling of pores occurs at a relative pressure of 0.75-0.95. This material has a large pore volume of 1.15 cc/g and a BET surface area of 306 $m^2$/g. The pore size distribution (BJH-adsorption branch) is centered at approximately 20 nm (FIG. 8B).

Figures 9A, 9B:
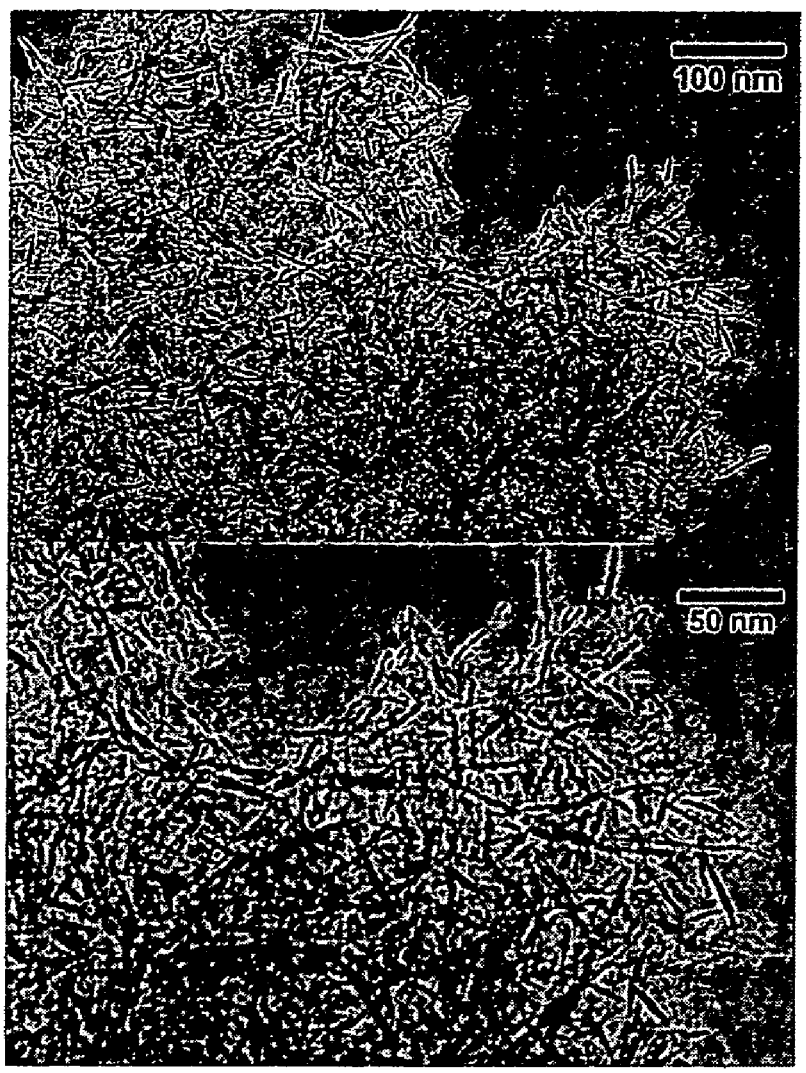
FIG. 9 shows TEM images of MSU-γ alumina prepared from an aluminum alkoxide and a PEO surfactant according to Example 16 on different scales.

From the TEM images of the MSU-γ prepared by the method of Example 16, it can be seen in FIG. 9 that the lath-shaped particles are uniform and approximately 5 nm in thickness. Although the particles are consistent in shape, their arrangement is random. In our MSU-γ alumina the porosity arises from void spaces created through the aggregation of fundamental particles. The physical properties for the as-made MSU-S/B and calcined MSU-γ aluminas prepared according to this example are provided in Table 3.

TABLE 2

Experimental x-ray diffraction peaks for the atomically ordered alumina phases comprising the mesostructured networks of MSU-S/B and MSU-γ aluminas in comparison to the diffraction peaks reported in the literature for boehmite and γ-alumina. The subscripts denote the relative intensities of the literature peaks. The experimental samples were prepared according to Example 16.

| MSU-B | | | MSU-γ | | |
|---|---|---|---|---|---|
| 2Θ degrees | $d_{100}$ Å | $d_{100}$ lit Å for boehmite | 2Θ degrees | $d_{100}$ Å | $d_{100}$ lit Å for γ-alumina |
| 13.8 | 6.44 | $6.11_{100}$ | 19.6 | 4.53 | $4.56_{40}$ |
| 28.1 | 3.18 | $3.16_{65}$ | 32.5 | 2.76 | $2.80_{20}$ |
| 38.2 | 2.36 | $2.35_{55}$ | 37.1 | 2.42 | $2.39_{80}$ |
| | | $1.86_{30}$ | 39.5 | 2.28 | $2.28_{50}$ |
| 49.3 | 1.85 | $1.85_{25}$ | 46.3 | 1.96 | $1.98_{100}$ |
| 54.7 | 1.65 | $1.66_{14}$ | | | $1.52_{30}$ |
| 64.7 | 1.44 | $1.45_{16}$ | 67.0 | 1.40 | $1.40_{100}$ |
| | | $1.43_{10}$ | | | |
| 71.9 | 1.31 | $1.31_{16}$ | | | |

Example 17

Example 17 illustrates that mesostructured MSU-S/B and mesostructured MSU-γ alumina can be prepared from the same aluminum alkoxide and block copolymer surfactant described in Example 16, but at a lower concentration of aluminum and surfactant. The following molar ratios were used:

| | |
|---|---|
| 1.0 | mole Al(OCH(CH$_3$)CH$_2$CH$_3$)$_3$ |
| 0.015 | mole P84 |
| 19.8 | mole water |
| 0.97 | mole 2-butanol |

That is, the amount of solvent used in this example is substantially larger in comparison to the amount in Example 16. Otherwise, the processing method was equivalent to Example 16. The physical properties for the as-made MSU-S/B and calcined MSU-γ aluminas prepared according to Example 17 are provided in Table 3.

Examples 18 and 19

Other non-ionic surfactants can be used in the formation of mesostructured MSU-S/B boehmite and MSU-γ alumina. Pluronic P123 is a block copolymer surfactant with the formula (EO)$_{20}$(PO)$_{69}$(EO)$_{20}$. Macol LA12 surfactant has a 12-carbon hydrophobic backbone with a 12 unit PEO polar head group. Both surfactants are commercially produced by BASF.

Examples 18 and 19 illustrate the preparation of mesostructured MSU-S/B boehmite and MSU-γ alumina from an aluminum alkoxide precursor using Pluronic P123 and Macol LA12 surfactants, respectively, as structure directors. The surfactant was dissolved in a solution of water and 2-butanol. To this surfactant solution, the aluminum alkoxide, diluted in 2-butanol, was slowly added. Hydrolysis of the alkoxide was achieved upon this addition. This mixture was sealed in a glass reaction jar and allowed to age in an oven for 24 hours to afford the MSU-S/B product. Subjecting the mesostructured MSU-S/B to calcination at 500° C. for 4 h yielded mesostructured MSU-γ alumina. The physical properties of the products of this example are given in Table 3.

Example 20

This example discloses the formation of a mesostructured boehmite phase, denoted MSU-B, from aluminum sec-butoxide, Al(OCH(CH$_3$)CH$_2$CH$_3$)$_3$ in the absence of surfactant, and the subsequent conversion of the MSU-B phase to MSU-γ through thermal dehydration.

To obtain MSU-B boehmite in the absence of surfactant, aluminum sec-butoxide was hydrolyzed according to the method of Example 16, except that the surfactant was omitted from the mixture. The alkoxide and 2-butanol were mixed together until homogenous. To this mixture, water was slowly added with gentle stirring until thorough mixing and complete hydrolysis was achieved. Following hydrolysis, the mixture was sealed in a glass jar and placed in an oven for 24 hr. The boehmite product was converted to MSU-γ following the calcination profile described in Example 16.

Figure 10A:
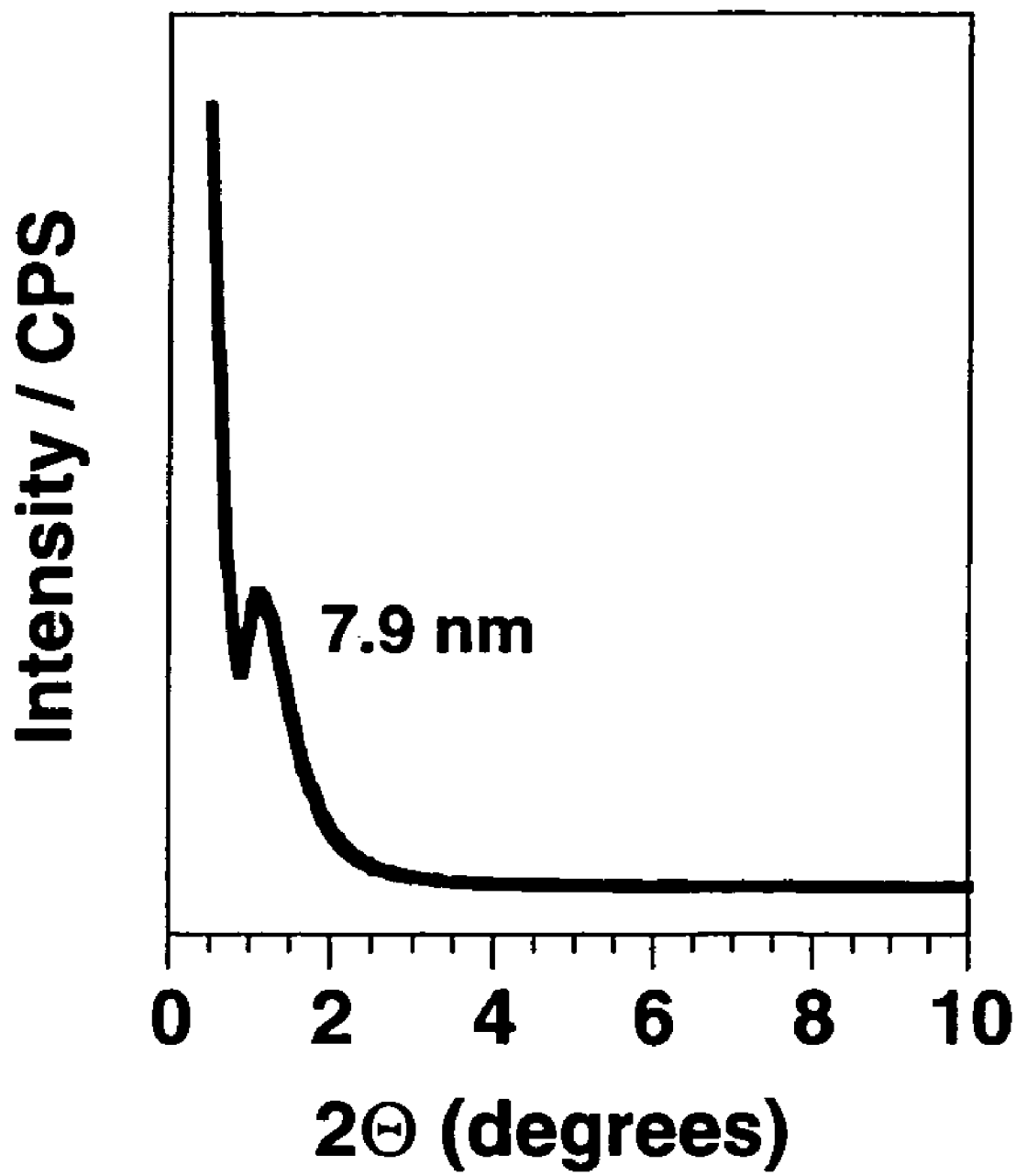
FIG. 10A shows low angle powder x-ray diffraction pattern of MSU-γ alumina prepared in absence of surfactant according to Example 20.
Figure 10B:
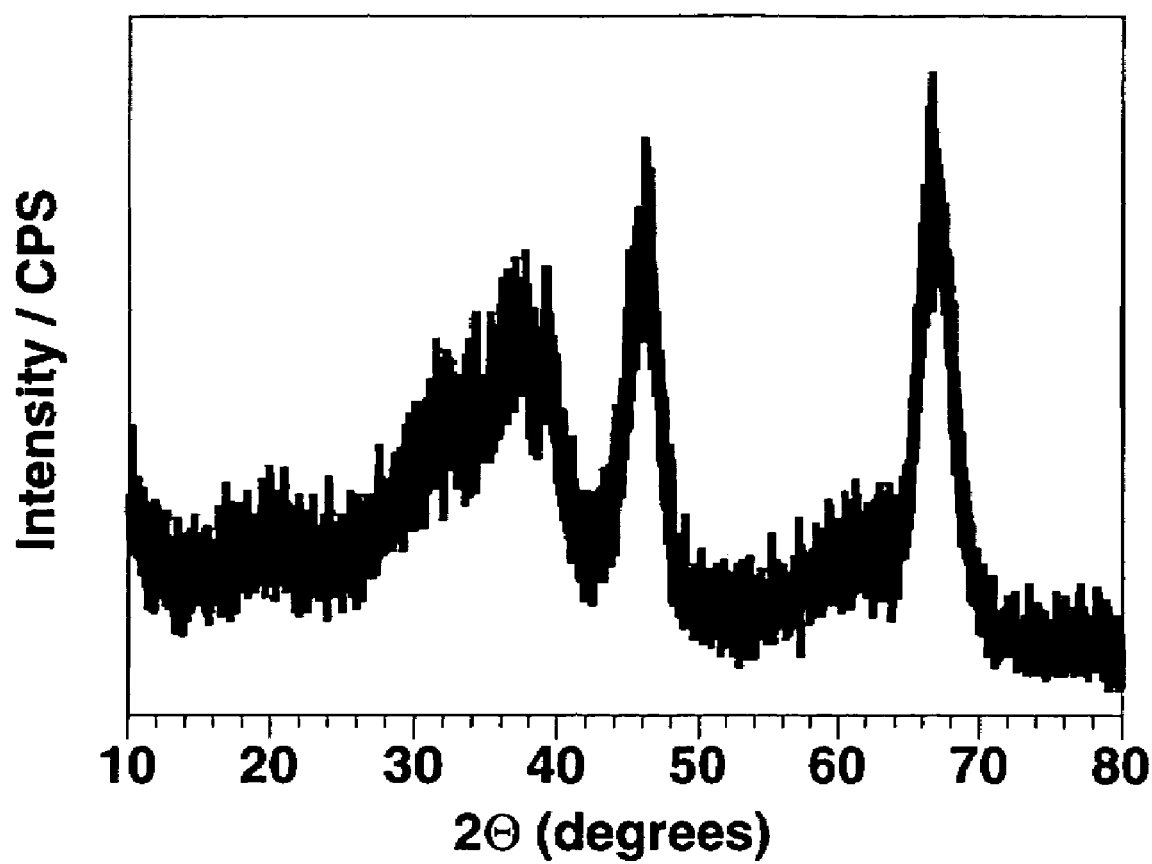
FIG. 10B shows wide angle powder x-ray diffraction pattern of MSU-γ alumina prepared in the absence of surfactant according to Example 20.

The low angle and wide angle powder x-ray diffraction patterns of the MSU-γ alumina prepared in the absence of surfactant are shown in FIGS. 10A and 10B, respectively. The relevant textural properties are reported in Table 3.

Example 21

This illustrates the formation of a mesostructured transition delta-alumina, denoted MSU-δ alumina, prepared by the direct calcination of an MSU-S/B precursor. This precursor was synthesized in a manner similar to the experimental procedure as described in Examples 18 and 19. However, in the present example, the alcohol used in the surfactant solution was ethanol instead of 2-butanol. The molar ratios are summarized in Table 3. To obtain the MSU-δ alumina, the MSU-S/B precursor was heated at 2° C./min to 800° C. and held constant at this temperature for 2 hours. Powder XRD patterns show a low angle peak corresponding to a d-spacing of 6.1 nm indicative of a mesophase and diffraction peaks assignable to δ-alumina in the high angle region (JCPDS Card#4-877). This product has a pore volume of 1.01 cc/g based on the filling of pores at partial pressures in the range 0.80-0.95. The pore size distribution determined from the adsorption isotherm was centered near 17 nm. The BET surface area was 247 m$^2$/g. In comparison, the surface area of a transition alumina prepared through dehydration of aluminum hydroxides at temperatures near 800° C. is typically less than 100 m$^2$/g and the pore volumes are typically about 0.2 cc/g.

Examples 22-23

These examples illustrate the preparation of a mesostructured boehmite (denoted MSU-B) from a MSU-S/B surfactant/boehmite precursor. This material was prepared in two different manners. Example 22 employs the hydrolysis of aluminum sec-butoxide in the presence of a long-chain primary amine, namely dodecylamine (DDA), as a structure director. DDA was dissolved in water and ethanol at room temperature and stirred until a clear solution resulted. To this

TABLE 3

Synthetic parameters and structural properties of as-made MSU-S/B boehmite and calcined MSU-γ alumina.

| | | | | | | MSU-γ | | | |
|---|---|---|---|---|---|---|---|---|---|
| Example | Precursor | Surfactant | Al:Modifer:H$_2$O:ROH molar ratio | Hydrolysis Temperature/° C. | MSU-S/B d$_{001}$/nm | d$_{001}$/ nm | S$_{BET}$/ m$^2$g$^{-1}$ | Pore volume/ cm$^3$g$^{-1}$ | BJH Pore Size/nm Ads/Des |
| 16 | Al(O—C$_4$H$_9$)$_3$ | P84 | 1:0.015:8.2:0.40 | 100 | 6.5 | 6.9 | 306 | 1.15 | 18/9 |
| 17 | Al(O—C$_4$H$_9$)$_3$ | P84 | 1:0.015:19.8:0.97 | 100 | — | 5.6 | 338 | 1.04 | 12/9 |
| 18 | Al(O—C$_4$H$_9$)$_3$ | P123 | 1:0.014:32.8:2.0 | 100 | — | 8.5 | 370 | 1.51 | 20/13 |
| 19 | Al(O—C$_4$H$_9$)$_3$ | LA12 | 1:0.047:13.6:0.82 | 100 | 5.5 | 7.1 | 331 | 0.80 | 11/8 |
| 20 | Al(O—C$_4$H$_9$)$_3$ | none | 1:0.0:19.8:0.97 | 100 | — | 7.9 | 259 | 0.47 | 6/6 |

The compositions of the non-ionic PEO surfactants are as follows: P84, (EO)$_{19}$(PO)$_{43}$(EO)$_{19}$; P123, (EO)$_{20}$(PO)$_{69}$(EO)$_{20}$; LAl2, C$_{12}$H$_{25}$(EO)$_{12}$. The alcohol used in each example (ROH) was 2-butanol.

solution, a specified amount of alkoxide was added. The molar ratios used were as follows:

| | |
|---|---|
| 1.0 mole | Al(OCH(CH$_3$)CH$_2$CH$_3$)$_3$ |
| 0.2 mole | dodecylamine |
| 3.5 mole | ethanol |
| 97.2 mole | water |

This solution was allowed to stir at room temperature for 20 hours. The as-made product was centrifuged, washed with water, and dried at 50° C. for 4 hr. To obtain the surfactant free mesostructured product, the sample was subjected to low temperature calcination. The sample was heated at 2° C./min to 300° C. and held there for 6 hr. At this temperature, the DDA was liberated without the concomitant conversion of boehmite to γ-alumina. In addition to a low angle peak at 2θ of 1.56 indicative a mesostructure, the boehmite phase was retained at this calcination temperature. The nitrogen isotherm showed filling of pores at partial pressures of 0.6-0.9 corresponding to an average pore size of 5.8 nm as judged by the BJH pore size distribution. The surface area of this MSU-B was 361 m$^2$/g.

Example 23 illustrates another approach to obtaining a mesostructured MSU-B based on the direct hydrolysis of an aluminum alkoxide without the aid of a structure-directing surfactant. In this case, an amount of the alkoxide was hydrolyzed with 3 molar equivalents of water and stirred until the alkoxide was completely reacted. Aluminum sec butoxide was poured into a glass jar. To this, 3 molar equivalents of water were added slowly with gentle stirring by spatula. Hydrolysis of the alkoxide was achieved upon contact. After mixing until homogeneous, the sample was allowed to air dry. Characterization by powder XRD revealed peaks in the wide angle region assignable to boehmite. No low angle XRD peaks were observed, suggesting that the pore to pore correlation peak was too large to be observed (>18.0 nm). Nitrogen adsorption yielded an isotherm indicative of pore filling over a large range of partial pressures. The average BJH pore size of this MSU-B sample was 6 nm. A large pore volume and BET surface area was also observed, 1.28 cc/g and 549 m$^2$/g, respectively.

This sample could also be calcined to yield a large pore size, large pore volume, high surface area γ-alumina. The γ-Al$_2$O$_3$ formed upon heating at 500° C. for 4 hours (2° C./min) had a peak in the low angle XRD pattern corresponding to a d-spacing of 4.6 nm. From nitrogen adsorption-desorption analysis, a pore volume of 1.25 cc/g and a BET surface area of 410 m$^2$/g was observed. BJH pore size distributions were centered at 9.0 nm (Ads) and 8.0 nm (Des).

It is intended that the foregoing description be only illustrative of the present invention and that the present invention be limited only by the hereinafter appended claims.

We claim:

1. A process for the preparation of a mesostructured, non-amorphous, crystalline transition alumina composition which exhibits: (i) at least one low angle x-ray diffraction line corresponding to a lattice spacing of at least 2.0 nm; and (ii) multiple wide angle x-ray diffraction lines between 10 and 80 degrees 2⊖ with CuKα radiation where λ is 0.1541 nm corresponding to an ordered oxygen atom lattice with aluminum in interstitial positions within the lattice; wherein the surface area is at least 200 m$^2$/g; wherein the pore volume is at least 0.40 cm$^3$/g;

which process comprises: heating a mesostructured, non-amorphous, crystalline hydrated alumina composition exhibiting: (i) at least one low angle x-ray diffraction line corresponding to a lattice spacing of at least 2.0 nm; and (ii) multiple wide angle x-ray diffraction lines between 10 and 80 degrees 2⊖ with CuKα radiation wherein λ is 0.1541 nm, corresponding to an ordered lattice comprised of oxygen atoms and hydroxide groups with aluminum in interstitial positions within the lattice to a temperature in the range 400 to about 900° C. for a period of time to cause dehydration of the hydrated alumina and the formation of the mesostructured form of the non-amorphous, crystalline transition alumina.

2. The process of claim 1 wherein the transition alumina is selected from the group consisting of gamma, delta, theta, eta, chi, and rho alumina and mixtures thereof.

3. A process for the formation of a mesostructured, non-amorphous, crystalline transition alumina composition:

wherein the composition exhibits: (i) at least one low angle x-ray diffraction line corresponding to a lattice spacing of at least 2.0 nm; and (ii) multiple wide angle x-ray diffraction lines between 10 and 80 degrees 2⊖ with CuKα radiation where λ is 0.1541 nm, corresponding to an ordered oxygen atom lattice with aluminum in interstitial positions within the lattice;

wherein the surface area is at least 200 m$^2$/g; and wherein the pore volume is at least 0.40 cm$^3$/g, which process comprises:

heating a mesostructured, non-amorphous, crystalline hydrated alumina and organic modifier composite composition, wherein the composition exhibits: (i) at least one low angle x-ray diffraction line corresponding to a lattice spacing of at least 2.0 nm; and (ii) multiple wide angle x-ray diffraction lines between 10 and 80 degrees 2⊖ corresponding to an ordered lattice comprised of oxygen atoms and hydroxide groups with aluminum in interstitial positions within the lattice; to a temperature in the range 400 to about 900° C. for a period of time to cause: (i) removal of the organic modifier component, (ii) dehydration of the hydrated alumina component, and (iii) the formation of the mesostructured form of the non-amorphous, crystalline transition alumina which is not amorphous.

4. The process of claim 3 wherein the transition alumina is selected from the group consisting of gamma, delta, theta, eta, chi, and rho alumina and mixtures thereof.

5. The process of claim 3 wherein the organic modifier is a non-ionic surfactant.

6. The process of claim 5 wherein the surfactant is selected from the group consisting of a polyethylene oxide block co-polymer, an alkylene amine; an alkylene polyamine, and a polypropylene oxide amine, and polypropylene oxide polyamine and mixtures thereof.

7. The process of claim 1 wherein the mesostructured crystalline hydrated alumina composition further comprises an organic modifier.

8. The process of claim 7 wherein the organic modifier comprises a surfactant.

9. The process of claim 8 wherein the surfactant comprises a non-ionic surfactant organic modifier.

10. The process of claim 9 wherein the non-ionic surfactant organic modifier is selected from the group consisting of a polyethylene oxide block co-polymer, an alkylene amine; an alkylene polyamine, a polypropylene oxide amine, polypropylene oxide polyamines and mixtures thereof.

* * * * *

UNITED STATES PATENT AND TRADEMARK OFFICE
CERTIFICATE OF CORRECTION

| | | |
|---|---|---|
| PATENT NO. | : 7,534,415 B2 | Page 1 of 1 |
| APPLICATION NO. | : 11/320025 | |
| DATED | : May 19, 2009 | |
| INVENTOR(S) | : Thomas J. Pinnavaia, Zhaorong Zhang and Randall Hicks | |

It is certified that error appears in the above-identified patent and that said Letters Patent is hereby corrected as shown below:

Column 6, line 18, "MSU-Y" should be --MSU-$\gamma$--.

Column 14, table 1, under the Precursor column for Example 1 "$A_1$" should be --$Al_{13}$--.

Column 14, table 1, under the Surfactant column for Example 1 "EO13" should be --$EO_{13}$--.

Column 14, table 1, under the Surfactant column for Example 2 "EO19" should be --$EO_{19}$--.

Column 14, table 1, under the Surfactant column for Example 3 "EO19" should be --$EO_{19}$--.

Column 15, table 1, under the Surfactant column for Example 6 "EO19" should be --$EO_{19}$--.

Column 15, table 1, under the Surfactant column for Example 7 "EO19" should be --$EO_{19}$--.

Column 15, table 1, under the Surfactant column for Example 8 "EO19" should be --$EO_{19}$--.

Signed and Sealed this

Fifteenth Day of December, 2009

David J. Kappos
*Director of the United States Patent and Trademark Office*